US009628764B2

(12) United States Patent
Ishizu

(10) Patent No.: US 9,628,764 B2
(45) Date of Patent: Apr. 18, 2017

(54) ELECTRONIC DEVICE CONTROLLING USER SETTING DEPENDING ON BATTERY STATE, COMPUTER READABLE MEDIUM, AND METHOD FOR DECIDING PERMISSION/PROHIBITION OF SELECTION

(71) Applicant: CASIO COMPUTER CO., LTD., Shibuya-ku, Tokyo (JP)

(72) Inventor: Takeo Ishizu, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 161 days.

(21) Appl. No.: 14/198,728

(22) Filed: Mar. 6, 2014

(65) Prior Publication Data
US 2014/0289542 A1    Sep. 25, 2014

(30) Foreign Application Priority Data

Mar. 22, 2013  (JP) ................................. 2013-060163

(51) Int. Cl.
  H04N 9/31      (2006.01)
  G03B 21/20     (2006.01)
  H02J 7/00      (2006.01)

(52) U.S. Cl.
  CPC ........... *H04N 9/31* (2013.01); *G03B 21/2053* (2013.01); *H02J 7/00* (2013.01); *H02J 7/0021* (2013.01);
  (Continued)

(58) Field of Classification Search
  CPC ........... G06F 1/26; G06F 1/3234; H04N 9/31; H04N 9/3155
  See application file for complete search history.

(56) References Cited

U.S. PATENT DOCUMENTS

| | | | |
|---|---|---|---|
| 8,271,054 B2 * | 9/2012 | Bockus | H04W 52/0258 320/106 |
| 2007/0223471 A1 * | 9/2007 | Kaneko | H04L 12/2838 370/389 |

(Continued)

FOREIGN PATENT DOCUMENTS

| | | |
|---|---|---|
| CN | 2760882 | 2/2006 |
| CN | 101364369 | 2/2009 |

(Continued)

OTHER PUBLICATIONS

Notification of the First Office Action for Chinese Patent Application No. 201410108075.1 dated Aug. 24, 2015, 29 pages.

(Continued)

*Primary Examiner* — Jaweed A Abbaszadeh
*Assistant Examiner* — Cheri Harrington
(74) *Attorney, Agent, or Firm* — Amin, Turocy & Watson LLP

(57) ABSTRACT

An electronic device includes: a storage battery; a residual quantity detection section that detects an electrical storage residual quantity of the storage battery; a setting member for receiving an input of a user setting including a plurality of options; a permission/prohibition deciding member that decides whether or not selection of each of the options corresponding to the user setting received by the setting member is permitted on the basis of the electrical storage residual quantity detected by the residual quantity detection section; and an indicating member that indicates an option which is prohibited from being selected by the permission/prohibition deciding member and an option which is permitted to be selected by the permission/prohibition deciding member so that each of the option prohibited from being selected and the option permitted to be selected is distinguishable.

10 Claims, 8 Drawing Sheets

(52) U.S. Cl.
CPC .... *H04N 9/3155* (2013.01); *H02J 2007/0067* (2013.01)

(56) References Cited

U.S. PATENT DOCUMENTS

| | | | | |
|---|---|---|---|---|
| 2009/0036158 A1* | 2/2009 | Fujinawa | ............... | G03B 17/54 |
| | | | | 455/556.1 |
| 2009/0141245 A1 | 6/2009 | Nozaki et al. | | |
| 2010/0110395 A1* | 5/2010 | Kotani | ............... | G03B 21/2066 |
| | | | | 353/119 |
| 2010/0321647 A1* | 12/2010 | Schuler | ................ | G06F 1/3203 |
| | | | | 353/121 |
| 2012/0178496 A1* | 7/2012 | Hwang | ............. | H04W 52/0264 |
| | | | | 455/550.1 |
| 2012/0297215 A1* | 11/2012 | Saba | ..................... | G06F 1/3203 |
| | | | | 713/320 |

FOREIGN PATENT DOCUMENTS

| | | |
|---|---|---|
| JP | 2002-359931 | 12/2002 |
| JP | 2007-078807 | 3/2007 |

OTHER PUBLICATIONS

Japanese Office Action for Japanese Patent Application No. 2013-060163 mailed on Dec. 20, 2016.

* cited by examiner

US 9,628,764 B2

ELECTRONIC DEVICE CONTROLLING USER SETTING DEPENDING ON BATTERY STATE, COMPUTER READABLE MEDIUM, AND METHOD FOR DECIDING PERMISSION/PROHIBITION OF SELECTION

CROSS-REFERENCE TO RELATED APPLICATIONS

This application is based upon and claims the benefit of priority from the prior Japanese Patent Application No. 2013-060163 filed on Mar. 22, 2013, the entire contents of which are incorporated herein by reference.

BACKGROUND OF THE INVENTION

Field of the Invention

The present invention relates to an electronic device that controls a user setting depending on a battery state, a program, and a method for deciding permission/prohibition of selection.

Description of the Related Art

Japanese Patent Application Laid-Open Publication No. 2007-78807 discloses a projection device including a storage battery embedded therein. This projection device projects a slideshow. When a necessary time for projecting the slideshow becomes longer than a projection possible time of the projection device estimated on the basis of a voltage of the storage battery, a consumption current of a light source of the projection device is automatically reduced by a control circuit so that luminance of the light source is automatically lowered by the control circuit.

However, Japanese Patent Application Laid-Open Publication No. 2007-78807 does not describe about user settings in the case that an electrical storage residual quantity of the storage battery becomes small. The user settings refer to various settings for the device, by which the device can be customized according to preference of a user.

An object of the present invention is to enable setting/removing restriction of options of the user setting depending on the magnitude of the electrical storage residual quantity of the storage battery.

SUMMARY OF THE INVENTION

According to one aspect of the present invention, an electronic device includes: a storage battery; a residual quantity detection section that detects an electrical storage residual quantity of the storage battery; a setting member for receiving an input of a user setting including a plurality of options; a permission/prohibition deciding member that decides whether or not selection of each of the options corresponding to the user setting received by the setting member is permitted on the basis of the electrical storage residual quantity detected by the residual quantity detection section; and an indicating member that indicates an option which is prohibited from being selected by the permission/prohibition deciding member and an option which is permitted to be selected by the permission/prohibition deciding member so that each of the option prohibited from being selected and the option permitted to be selected is distinguishable.

BRIEF DESCRIPTION OF THE DRAWINGS

The above and further objects, features and advantages of the present invention will be made clearer by the following detailed description and the attached drawings, in which.

DETAILED DESCRIPTION OF THE PREFERRED EMBODIMENT

Hereinafter, a best mode for carrying out the present invention will be described with reference to the drawings. Although various technically preferable limitations are added to embodiments described later, the scope of the present invention is not limited to the embodiments and illustrated examples.

[First Embodiment]

Figure 1:
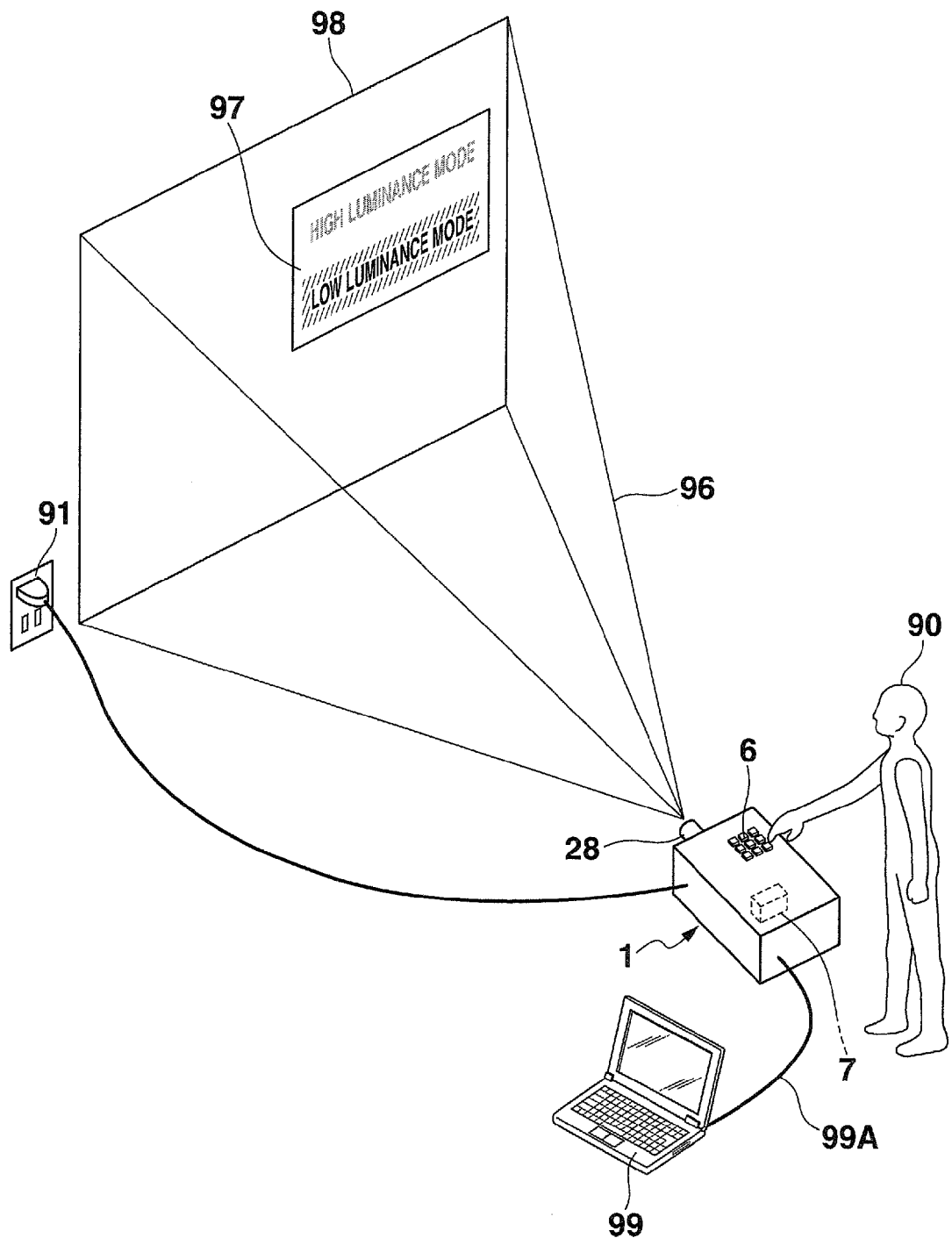
FIG. 1 is a perspective view illustrating a usage state of an electronic device according to a first embodiment of the present invention.

FIG. 1 is a perspective view illustrating a usage state of a projection device 1.

The projection device 1 is an electronic device. An external device 99 is connected to the projection device 1. A video picture generated by the external device 99 is transferred to the projection device 1 from the external device 99 as a video signal, and the projection device 1 projects a projected image 98 based on the video signal on a screen. The projection device 1 has a function of adjusting luminance (brightness) of projection light 96 of the projected image 98. In other words, a user 90 can increase/decrease the luminance of the projection light 96 by operating an operation section 6 of the projection device 1.

The luminance of the projection light 96 can be adjusted in stages by operation in the operation section 6 by the user 90, and there are a plurality of options of a user setting regarding the luminance of projection light 96. In other words, there are plural options as setting conditions of the operation of the projection device 1. Specifically, the luminance of projection light 96 can be adjusted in two stages (ranges), and the options of the user setting regarding the luminance of projection light 96 include a high luminance setting (first option) and a low luminance setting (second option). When the user 90 sets the user setting to the high luminance setting (high luminance mode) by operating the operation section 6, the projection device 1 projects the projection light 96 with high luminance. On the other hand, when the user 90 sets the user setting to the low luminance setting (low luminance mode) by operating the operation section 6, the projection device 1 projects the projection light 96 with low luminance. The projection light 96 in the high luminance setting has higher luminance than that of the projection light 96 in the low luminance setting. Incidentally, the present invention does not limit the number of stages of the user setting regarding the luminance of projection light 96 to two.

The high luminance setting is a high consumption power setting, and the low luminance setting is a low consumption power setting. Concretely, consumption power of the projection device 1 in the case that the user setting regarding the luminance of the projection light 96 is selected so as to be the high luminance setting is higher than consumption power of the projection device 1 in the case that the user setting regarding the luminance of the projection light 96 is selected so as to be the low luminance setting.

The projection device 1 includes a storage battery (secondary battery) 7 embedded therein, and is capable of charging the storage battery 7. The projection device 1 operates by utilizing electrical power of the storage battery 7. When an external power source 91 (for example, commercial power supplied from an electrical power company, an electricity transmission company, etc.) is connected to the projection device 1, electrical power is supplied to the projection device 1 from the external power source 91, and thereby the projection device 1 operates by utilizing electrical power of the external power source 91 while the storage battery 7 of the projection device 1 is charged.

When an electrical storage residual quantity of the storage battery 7 is large, the options of the user setting regarding the luminance of the projection light 96 are not restricted. Concretely, selection of the high luminance setting and selection of the low luminance setting are permitted in the use setting regarding the luminance of the projection light 96. Thus, a user can select one of the high luminance setting and the low luminance setting as the user setting regarding the luminance of the projection light 96 by operating the operation section 6.

On the other hand, when the electrical storage residual quantity of the storage battery 7 is small, the options of the user setting regarding the luminance of the projection light 96 are restricted. Concretely, selection of the low luminance setting is permitted, but selection of the high luminance setting is prohibited, in the user setting regarding the luminance of the projection light 96. Thus, a user can select the low luminance setting but cannot select the high luminance setting as the user setting regarding the luminance of the projection light 96, by operating the operation section 6.

Whether the electrical storage residual quantity (residual charge quantity) of the storage battery 7 is large or small is judged with a predetermined threshold value as a reference. Concretely, when the residual quantity of electricity stored in the storage battery 7 exceeds the predetermined threshold value, both of selections of the high luminance setting and the low luminance setting are permitted in the user setting regarding the luminance of the projection light 96. On the other hand, when the residual quantity of electricity stored in the storage battery 7 is equal to or less than the predetermined threshold value, selection of the low luminance setting is permitted but selection of the high luminance setting is prohibited in the user setting regarding the luminance of the projection light 96. In other words, the predetermined threshold value is a judgment reference for judging whether or not each of the options is permitted to be selected, and used for discriminating the options from one another. The high luminance setting corresponds to the electrical storage residual quantity which exceeds the predetermined threshold value, and the low luminance setting corresponds to the electrical storage residual quantity which is equal to or less than the predetermined threshold value. Incidentally, because the residual quantity of electricity stored in the storage battery 7 can be converted into a remaining time during which the projection device 1 can operate by the residual quantity of electricity, the electrical storage residual quantity corresponds to the remaining time and the threshold value is converted into a threshold value represented by a unit of time.

When the electrical storage residual quantity of the storage battery 7 becomes equal to or less than the predetermined threshold value in the state that the user setting regarding the luminance of the projection light 96 is selected so as to be the high luminance setting during the operation of the projection device 1, the projection device 1 operates as described in one of the following items (1) and (2).

(1) The user setting regarding the luminance of the projection light 96 is automatically changed into the low luminance setting, and the luminance of the projection light 96 lowers. Then, selection of the high luminance setting is prohibited until the electrical storage residual quantity of the storage battery 7 exceeds the predetermined threshold value.

(2) The user setting regarding the luminance of the projection light 96 is maintained in the high luminance setting, and the luminance of the projection light 96 is maintained at high luminance. When the user 90 selects the low luminance setting by operating the operation section 6, selection of the high luminance setting is prohibited until the electrical storage residual quantity of the storage battery 7 exceeds the predetermined threshold value after that.

At the time of adjusting the luminance of the projection light 96, a user setting display region 97 is displayed in the projected image 98. The user setting display region 97 is created by the projection device 1. Concretely, by superimposing a signal for displaying the user setting display region 97 on the video signal, the user setting display region 97 is displayed in the projected image 98.

In the user setting display region 97, a plurality of options (high luminance setting and low luminance setting) of the user setting regarding the luminance of the projection light 96 are displayed. Among the options, currently-selected option and non-selected option are displayed so as to be distinguishable from each other. Specifically, a color except white or a pattern is added to a background of each selected option, and a white color is added to a background of each non-selected option.

Among the options displayed in the user setting display region 97, the option permitted to be selected and the option prohibited from being selected are displayed so as to be distinguishable from each other. For example, characters representing the option permitted to be selected are displayed with a black color, and characters representing the option prohibited from being selected are displayed with a gray color or a semitransparent color.

Thus, the user 90 can adjust the luminance of the projection light 96 by operating the operation section 6 while looking at the user setting display region 97. Incidentally, the display content of the user setting display region 97 can also be displayed by a display device (for example, a liquid crystal display) or a signal lamp (for example, a light emitting diode that blinks, lights or goes out depending on the display content) included in the projection device 1.

The projection device 1 can adjust an image tone (image quality) of the projected image 98. The user 90 can adjust the image tone of the projected image 98 by operating the operation section 6 of the projection device 1. The image tones which can be set include a cinema tone, a sport watching tone, a photo tone, a game tone, a computer graphic tone, and so on. In other words, as the options of the user setting regarding the image tone, there are the cinema tone, the sport watching tone, the photo tone, the game tone and the computer graphic tone.

Figure 2:
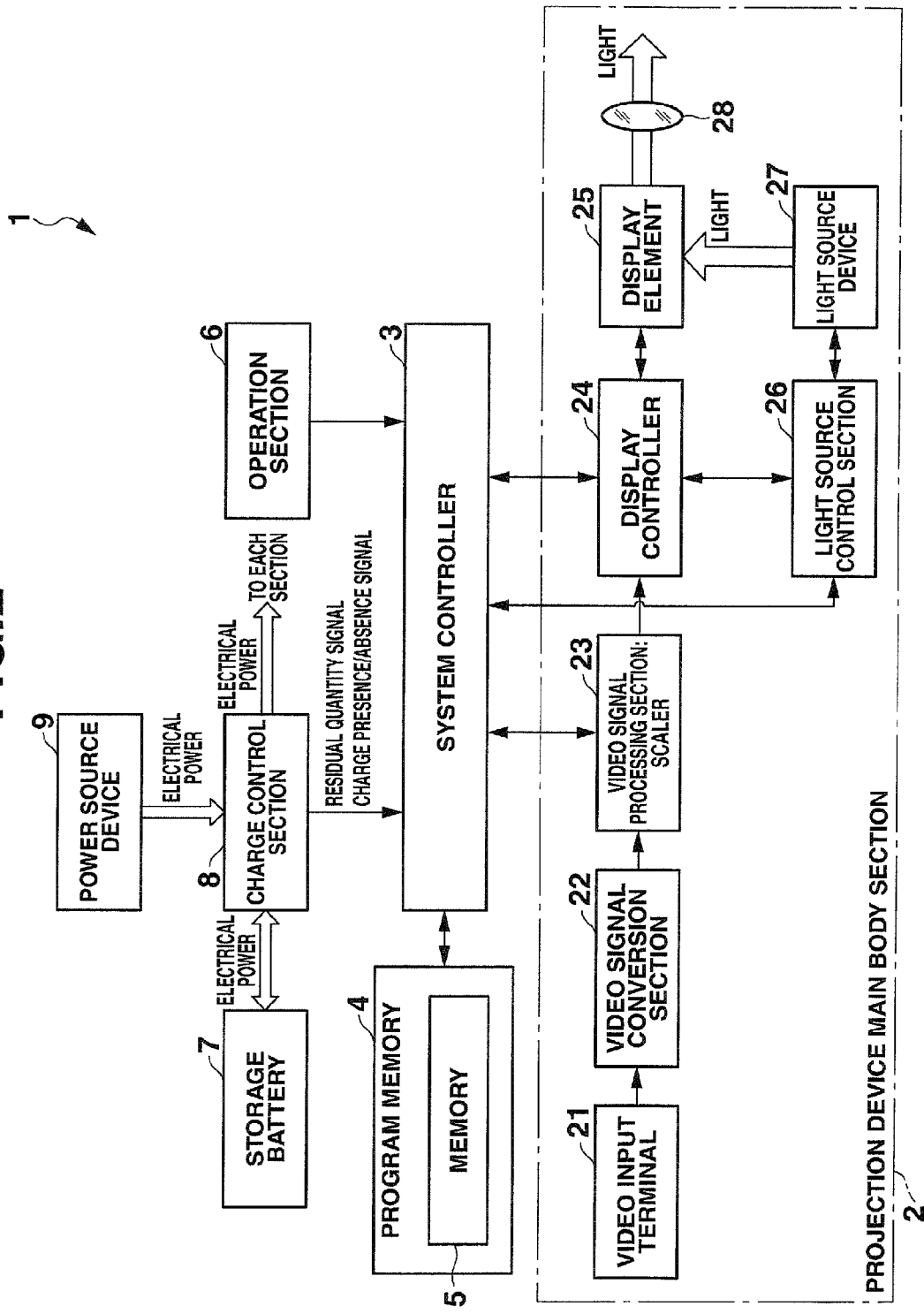
FIG. 2 is a block diagram of the electronic device.

FIG. 2 is a block diagram of the projection device 1.

The projection device 1 includes a projection device main body section 2, a system controller 3, a program memory 4, the operation section 6, the storage battery 7, a charge control section 8, a power source device 9, etc.

The storage battery 7 includes, for example, a lead storage battery, a lithium ion secondary battery, a lithium ion polymer secondary battery, a nickel-hydrogen storage battery, a nickel-cadmium storage battery, a nickel-iron storage battery, a nickel-zinc storage battery and a silver oxide-zinc storage battery.

The power source device 9 is a stabilized power source that keeps a direct current (DC) output voltage constant. Concretely, the power source device 9 lowers a voltage of alternating-current (AC) power input from the external power source 91, converts the AC power into a DC power of a constant voltage, and outputs the DC power to the charge control section 8. The power source device 9 may be placed in a housing of the projection device 1, or may be placed outside the housing. In the case that the power source device 9 is placed outside the projection device 1, the power source device 9 is connected to the charge control section 8 by wiring. In the case that the power source device 9 is not connected to the external power source 91, the DC power is not supplied to the charge control section 8 from the power source device 9.

The charge control section 8 is a circuit that controls charge/discharge of the storage battery 7. Concretely, the charge control section 8 supplies a part of the DC power supplied from the power source device 9 to the respective sections (the system controller 3, the program memory 4, the operation section 6, the projection device main body section 2, etc.) of the projection device 1, and charges the storage battery 7 with a part of the DC power supplied from the power source device 9. In the case that the DC power is not supplied to the charge control section 8 from the power source device 9, the charge control section 8 supplies the electrical power stored in the storage battery 7 to the respective sections (the system controller 3, the program memory 4, the operation section 6, the projection device main body section 2, etc.) of the projection device 1.

The charge control section 8 detects the electrical storage residual quantity of the storage battery 7, and outputs a signal (hereinafter referred to as a residual quantity signal) representing the electrical storage residual quantity, to the system controller 3. In other words, the charge control section 8 is an electrical storage residual quantity detection section.

The charge control section 8 also outputs a signal (namely, a signal representing whether or not charging is currently being performed, hereinafter referred to as a charge presence/absence signal) representing whether or not the DC power is supplied from the power source device 9, to the system controller 3. The charge presence/absence signal indicates "1 (charging)" when the DC power is being supplied to the charge control section 8 from the power source device 9, and the charge presence/absence signal indicates "0 (not charging)" when the DC power is not being supplied to the charge control section 8 from the power source device 9.

The operation section 6 is an input device that receives an input by the user 90, and is equipped with, for example, a plurality of switches (push buttons), a dial, or the like. When the user 90 operates the operation section 6, the operation section 6 outputs signals to the system controller 3, depending on operational contents, by wireless or wire communication. The operation section 6 is provided in the housing of the projection device 1, or provided separately from the housing.

The projection device main body section 2 receives an input of the video signal output from the external device 99, and projects the projected image based on the video signal on the screen. The projection device main body section 2 includes a video input terminal 21, a video signal conversion section 22, a video signal processing section (scaler) 23, a display controller 24, a display element 25, a light source control section 26, a light source device 27, a projection lens 28, and so on.

The projection device main body section 2 is a DMD type projection device main body section, an LCD type projection device main body section, or a Liquid crystal on silicon (LCOS; trademark) type projection device main body section. The DMD type projection device main body section uses a digital micro-mirror device (DMD) as the display element 25. The LCD type projection device main body section uses a transmissive liquid crystal display (LCD) panel as the display element 25. The LCOS type projection device main body section uses a reflective LCD panel as the display element 25.

The housing of the projection device 1 is equipped with the video input terminal 21. A video output terminal of the external device 99 is connected to the video input terminal 21 via a video signal cable 99A (see FIG. 1), and the video signal output from the external device 99 is input into the video input terminal 21.

The video signal conversion section 22, the video signal processing section 23, the display controller 24, the display element 25, the light source control section 26 and the light source device 27 are provided in the inside of the projection device 1. The video signal conversion section 22 converts an analog video signal input via the video input terminal 21 into a digital video signal, and further converts this digital video signal or a digital video signal input into the video input terminal 21 into a predetermined format.

The video signal processing section 23 performs various signal processes to the video signal output from the video signal conversion section 22. For example, the video signal processing section 23 receives an input of a signal (generated by the system controller 3) for displaying the user setting display region 97 (see FIG. 1) from the system controller 3, and superimposes this signal on the video signal input from the video signal conversion section 22 so that the user setting display region 97 is synthesized with the projected image 98. Moreover, the video signal processing section 23 performs scaling of the video signal input from the video signal conversion section 22 so as to increase/decrease the number of pixels (resolution) of the video signal. Furthermore, the video signal processing section 23 performs keystone correction, fitting correction, or both of them by executing coordinate conversion (for example, projection transformation) of the projected image based on the video signal which has been subjected to scaling. The video signal which has been subjected to signal processes by the video signal processing section 23 is transferred to the display controller 24.

The display element 25 is a spatial light modulation element, and more specifically, a DMD, a transmissive LCD panel or a reflective LCD panel. The display element 25 includes a plurality of pixels arranged in a two-dimensional array state, etc. In the case that the display element 25 is the DMD, the pixels of the display element 25 are movable micro mirrors. In the case that the display element 25 is the transmissive LCD panel or the reflective LCD panel, the pixels of the display element 25 are liquid crystal elements.

The display controller 24 drives the display element 25 on the basis of the video signal input from the video signal processing section 23. For example, the display controller 24 performs PWM control, PNM control, or the like for each pixel of the display element 25 according to the video signal input from the video signal processing section 23, and thereby light with which the display element 25 is irradiated is modulated for each pixel depending on the pixel. Thus, the projected image is formed by the display element 25.

The number of the display element(s) 25 is one(1) or plural (for example, three).

The light source device 27 emits visible light to the display element(s) 25. Specifically, the light source device 27 has a time-division system or a color separation system.

In the case that the light source device 27 has the color separation system, the light source device 27 includes a white light source, a color separator, etc., and white light emitted from the white light source is separated into a plurality of colors (for example, red, green and blue) by the color separator. In this case, there are the plurality of display elements 25. Each of the display elements 25 generates a video picture for each color and is irradiated with light of each color, and lights of the respective colors which have penetrated the display elements 25 or have reflected by the display elements 25 are synthesized. The synthesized projection light 96 is projected on the screen by the projection lens 28, and thereby the color projected image 98 appears on the screen.

In the case that the light source device 27 has the time-division system, the light source device 27 sequentially repeats emission of visible lights of different colors from one another (for example, red, green and blue) so that the display element 25 is irradiated with the lights. One repetition period corresponds to a time period during which a color video picture of one(1) frame is generated by the display element 25. In this case, there is one(1) display element 25, which sequentially repeats generation of video pictures of different colors from one another. More specifically, the display element 25 creates the video picture having the same color as light emitted from the light source device 27 in synchronization with the light emission timing. Lights of the respective colors which have penetrated the display element 25 or have reflected by the display element 25 are synthesized according to the time. The synthesized projection light 96 is projected on the screen by the projection lens 28, and thereby the color projected image 98 appears on the screen.

In the case that the light source device 27 has the time-division system, the light source device 27 becomes a color filter system or a color light source system. In the case that the light source device 27 has the color filter system, the light source device 27 includes a color filter, a spindle motor, a white light source, etc. The color filter rotates by the spindle motor and white light emitted from the white light source penetrates rotating color filter, and thereby conversion from white light into each of the colors (red, green and blue) is sequentially repeated. In the case that the light source device 27 has the color light source system, the light source device 27 includes a plurality of light sources (for example, a red light source, a green light source, and a blue light source) of different colors from one another, and these light sources sequentially repeats lighting.

The light source used in the light source device 27 is a semiconductor light-emitting element (for example, a laser diode or a light-emitting diode), a lamp (for example, a halogen lamp, a xenon lamp, metal halide lamp, a mercury lamp or a discharge lamp), or a light source obtained by combining a fluorescent substance with the semiconductor light-emitting element or the lamp.

The light source control section 26 controls the luminance of the light source device 27. Concretely, the system controller 3 outputs a dimming signal representing the luminance to the light source control section 26, and the light source control section 26 causes the light source device 27 to emit light with the luminance according to the dimming signal input from the system controller 3.

Moreover, in the case that the light source device 27 has the time-division system, the light source control section 26 controls emission timings of the respective colors of the light source 27 on the basis of timing signals input from the display controller 24. Thus, the light emitted from the light source device 27 is synchronized with the timing at which the video picture of the same color as the light is generated by the display element 25.

The projection lens 28 is capable of adjusting focusing, and capable of adjusting a focal distance.

The system controller 3 is an arithmetic processing unit (computer) including a CPU, a storage device, etc.

The program memory 4 is a non-volatile semiconductor memory or magnetic storage device. The program memory 4 stores a program 5.

The system controller 3 accesses the program memory 4 to read the program 5. The system controller 3 executes processes according to the program 5. Thus, the system controller 3 integrally controls the video signal processing section 23, the display controller 24 and the light source control section 26.

Next, the processes executed by the system controller 3 on the basis of the program 5 will be described.

Figure 3:
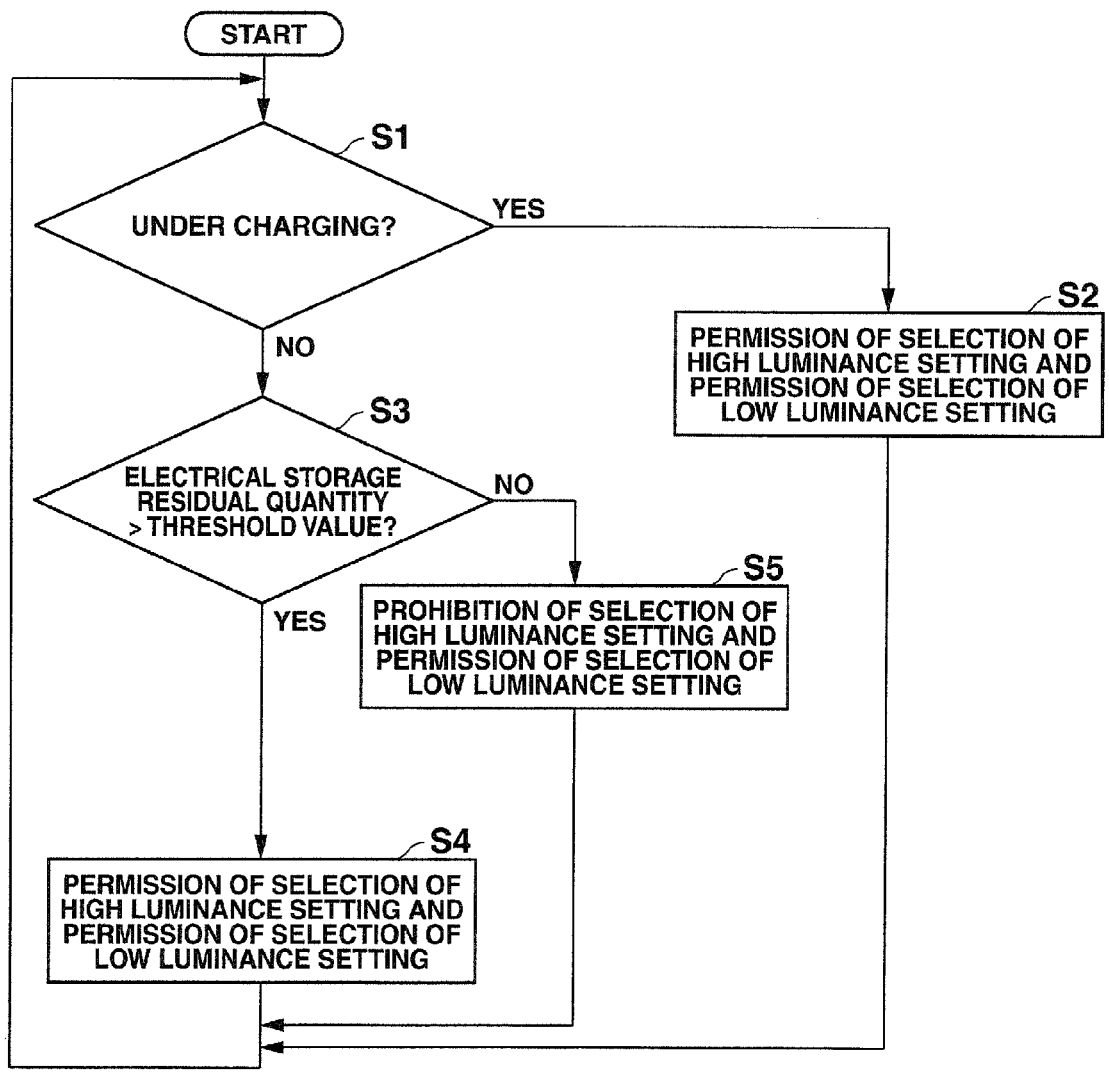
FIG. 3 is a flowchart for explaining a flow of processing executed by a computer included in the electronic device.

FIG. 3 is a flowchart of permission/prohibition deciding processing. First, the system controller 3 judges whether or not charging is being performed on the basis of the charge presence/absence signal input from the charge control section 8 (Step S1). At that time, when electrical power is being supplied to the charge control section 8 from the power source device 9 (Step S1: YES), the system controller 3 permits selections of the high luminance setting and the low luminance setting among the options (Step S3), and stores the fact that the selections of the high luminance setting and the low luminance setting are permitted. Then, processing by the system controller 3 returns to Step S1.

On the other hand, when electrical power is not being supplied to the charge control section 8 from the power source device 9 (Step S1: NO), the system controller 3 decides permission/prohibition of selections of the options (the high luminance setting and the low luminance setting) of the user setting regarding output luminance of the projection device main body section 2 (especially the light source device 27) on the basis of the electrical storage residual quantity detected by the charge control section 8 (see Step S3 to Step S5).

Concretely, the system controller 3 firstly compares the electrical storage residual quantity detected by the charge control section 8 with a predetermined threshold value (Step S3). In other words, the system controller 3 compares the level of the residual quantity signal output from the charge control section 8 with the predetermined threshold value.

When the system controller 3 judges that the electrical storage residual quantity exceeds the predetermined threshold value as a result of comparison (Step S3: YES), the system controller 3 permits selections of the high luminance setting and the low luminance setting among the options (Step S4). Then the system controller 3 stores the fact that selections of the high luminance setting and the low luminance setting are permitted. After that, processing by the system controller 3 returns to Step S1.

On the other hand, when the system controller 3 judges that the electrical storage residual quantity is equal to or less than the predetermined threshold value as a result of comparison (Step S3: NO), the system controller 3 permits selection of the low luminance setting and prohibits selection of the high luminance setting, among the options (Step S5). Then the system controller 3 stores the face that selection of the low luminance setting is permitted but selection of the high luminance setting is prohibited. After that, processing by the system controller 3 returns to Step S1.

The system controller 3 repeatedly performs the permission/prohibition deciding processing illustrated in FIG. 3.

Regardless of whether the electrical power is being supplied to the charge control section 8 from the power source device 9, when the user 90 inputs a command of a user setting mode by operation in the operation section 6, the system controller 3 executes the user setting processing. The user setting processing is performed after the processing illustrated in FIG. 3 is performed one or more times. In this regard, however, because the permission/prohibition deciding processing is repeatedly executed, sometimes the user setting processing is performed in parallel with the permission/prohibition deciding processing. Incidentally, it is also possible to execute the user setting processing subsequently to Step S2, S4 and S5 in FIG. 3.

The user setting processing is executed for selecting one of the options of the user setting regarding the output luminance of the projection device main body section 2 (especially, the light source device 27). Hereinafter the user setting processing will be described specifically.

First, the system controller 3 generates the display signal of the user setting display region 97 to output the display signal to the video signal processing section 23. By this, the display signal of the user setting display region 97 is superimposed on the video signal by the video signal processing section 23, and the user setting display region 97 is synthesized with the projected image 98.

At that time, the system controller 3 determines display modes of the plural options (the high luminance setting and the low luminance setting) on the basis of the stored result of the permission/prohibition deciding processing illustrated in FIG. 3, and generates the display signal of the user setting display region 97 according to the display modes. Specifically, the system controller 3 creates the display signal for implementing the display modes by which the options permitted to be selected (the high luminance setting and the low luminance setting in the case of Step S2 or Step S4, and the low luminance setting in the case of Step S5) and the options prohibited from being selected (no option in the case of Step S2 or Step 4, and the high luminance setting in the case of Step S5) are distinguishable from each other, and outputs the display signal to the video signal processing section 23. Thus, each of the option which is prohibited from being selected by the permission/prohibition deciding member and the option which is permitted to be selected by the permission/prohibition deciding member is indicated so as to be distinguishable. Incidentally, also display modes by which the options permitted to be selected are displayed in the user setting display region 97 and the options prohibited from being selected are not displayed in the user setting display region 97 can be adopted.

Then the user 90 selects any one of the options (one of the high luminance setting and the low luminance setting) by operating the operation section 6. Concretely, the signal according to the operation content is output to the system controller 3 when the user 90 operates the operation section 6, and the system controller 3 selects any one of the options on the basis of the signal. At that time, the system controller 3 does not accept selections of the options which are prohibited from being selected as a result of the permission/prohibition deciding processing illustrated in FIG. 3, and accepts selections of the options which are permitted to be selected as a result of the permission/prohibition deciding processing illustrated in FIG. 3.

After that, the system controller 3 outputs the dimming signal representing the luminance according to the selected option to the light source control section 26. Then the light source control section 26 causes the light source device 27 to emit light with the luminance according to the dimming signal input from the system controller 3. Concretely, when the user setting regarding the output luminance of the projection device main body section 2 is set to the high luminance setting by operation in the operation section 6 by the user 90, the light source device 27 emits light with high luminance, and the high-intensity projection light 96 is projected. When the user setting regarding the output luminance of the projection device main body section 2 is set to the low luminance setting by operation in the operation section 6 by the user 90, the light source device 27 emits light with low luminance, and the low-intensity projection light 96 is projected. Incidentally, the system controller 3 stores the content of the user setting regardless of whether the user setting is set to the high luminance setting or the low luminance setting by the operation in the operation section 6 by the user 90.

According to this embodiment, the following advantages can be obtained.

(a) Because selection of the high luminance setting is prohibited in the user setting when the electrical storage residual quantity of the storage battery 7 is small, available time of the projection device 1 can be extended.

(b) Because selection of the high luminance setting is permitted in the user setting when the electrical storage residual quantity of the storage battery 7 is large, the projection light 96 becomes brighter and the projection device 1 can be used comfortably.

(c) Customization variation can be changed depending on the magnitude of the electrical storage residual quantity of the storage battery 7. Concretely, because selections of the high luminance setting and the low luminance setting are permitted in the user setting when the electrical storage residual quantity of the storage battery 7 is large, and because selection of the high luminance setting is prohibited and selection of the low luminance setting in permitted in the user setting when the electrical storage residual quantity of the storage battery 7 is small, it is possible to make the variation of customization regarding the luminance in the case that the electrical storage residual quantity of the storage battery 7 is large different from the variation of customization regarding the luminance in the case that the electrical storage residual quantity of the storage battery 7 is small.

[Variation 1]

Although the luminance of projection light 96 can be adjusted in two stages in the above embodiment, the luminance can also be adjusted in three or more stages. In other words, though the number of the options of the user setting regarding the output luminance of the projection device main body section 2 is two in the above embodiment, the number of the options may be three or more. In this case, the number of the threshold values compared with the electrical storage residual quantity is a value obtained by subtracting one(1) from the number of the options, and these threshold values are prepared by stages.

For example, in the case that the luminance of the projection light 96 can be adjusted in three stages, there are the high luminance setting, a middle luminance setting and the low luminance setting as the options of the user setting regarding the output luminance of the projection device main body section 2, and the system controller 3 compares the detected electrical storage residual quantity with a high threshold value and a low threshold value (high threshold value>low threshold value). When the detected electrical storage residual quantity exceeds the high threshold value, selections of the high luminance setting, the middle luminance setting and the low luminance setting are permitted in the user setting. When the detected electrical storage residual quantity exceeds the low threshold value and is equal to or less than the high threshold value, selections of the middle luminance setting and the low luminance setting are permitted but selection of the high luminance setting is prohibited in the user setting. When the detected electrical storage residual quantity is equal to or less than the low threshold value, selection of the low luminance setting is permitted but selections of high luminance setting and the middle luminance setting are prohibited in the user setting.

[Variation 2]

There can also be adopted a configuration where the system controller 3 decides permission/prohibition of selection of each of the options (for example, the first option: automatic execution of Rom update, the second option: manual execution of Rom update, and the third option: prohibition of execution of Rom update) of the user setting regarding execution of Rom update (system program update) on the basis of the electrical storage residual quantity detected by the charge control section 8. For example, when the electrical storage residual quantity detected by the charge control section 8 exceeds the high threshold value, selections of the first to third options are permitted in the user setting. When the electrical storage residual quantity detected by the charge control section 8 is equal to or less than the high threshold value and exceeds the low threshold value (wherein high threshold value>low threshold value), selections of the second and third options are permitted in the user setting, and selection of the first option is prohibited in the user setting. When the electrical storage residual quantity detected by the charge control section 8 is equal to or less than the low threshold value, selection of the third option is permitted in the user setting, and selections of the first and second options are prohibited in the user setting.

[Variation 3]

There can also be adopted a configuration where the system controller 3 decides permission/prohibition of selection of each of the options (for example, the first option: on-setting of a gesture sensor, and the second option: off-setting of the gesture sensor) of the user setting regarding on/off setting of the gesture sensor on the basis of the electrical storage residual quantity detected by the charge control section 8. For example, when the electrical storage residual quantity detected by the charge control section 8 exceeds a threshold value, selections of the first and second options are permitted in the user setting. When the electrical storage residual quantity detected by the charge control section 8 is equal to or less than the threshold value, selection of the second option is permitted but selection of the first option is prohibited in the user setting.

[Second Embodiment]

The same referential marks are used for components which are common in the first and second embodiments.

The projection device 1 of the second embodiment has the same configuration as that of the projection device 1 of the first embodiment (see FIG. 2). In this regard, however, the program 5 stored in the program memory 4 of the second embodiment is different from the program 5 stored in the program memory 4 of the first embodiment. Additionally, processing executed by the system controller 3 according to the program 5 in the second embodiment is different from processing executed by the system controller 3 according to the program 5 in the first embodiment.

In the first embodiment, the user setting is related to the output luminance of the projection device main body section 2 (especially the light source device 27), and permission/prohibition of the options of the user setting is decided on the basis of the electrical storage residual quantity of the storage battery 7. On the other hand, in the second embodiment, the user setting is related to a kept time (set time), and permission/prohibition of the options of the user setting is decided on the basis of the electrical storage residual quantity of the storage battery 7.

Figure 4:
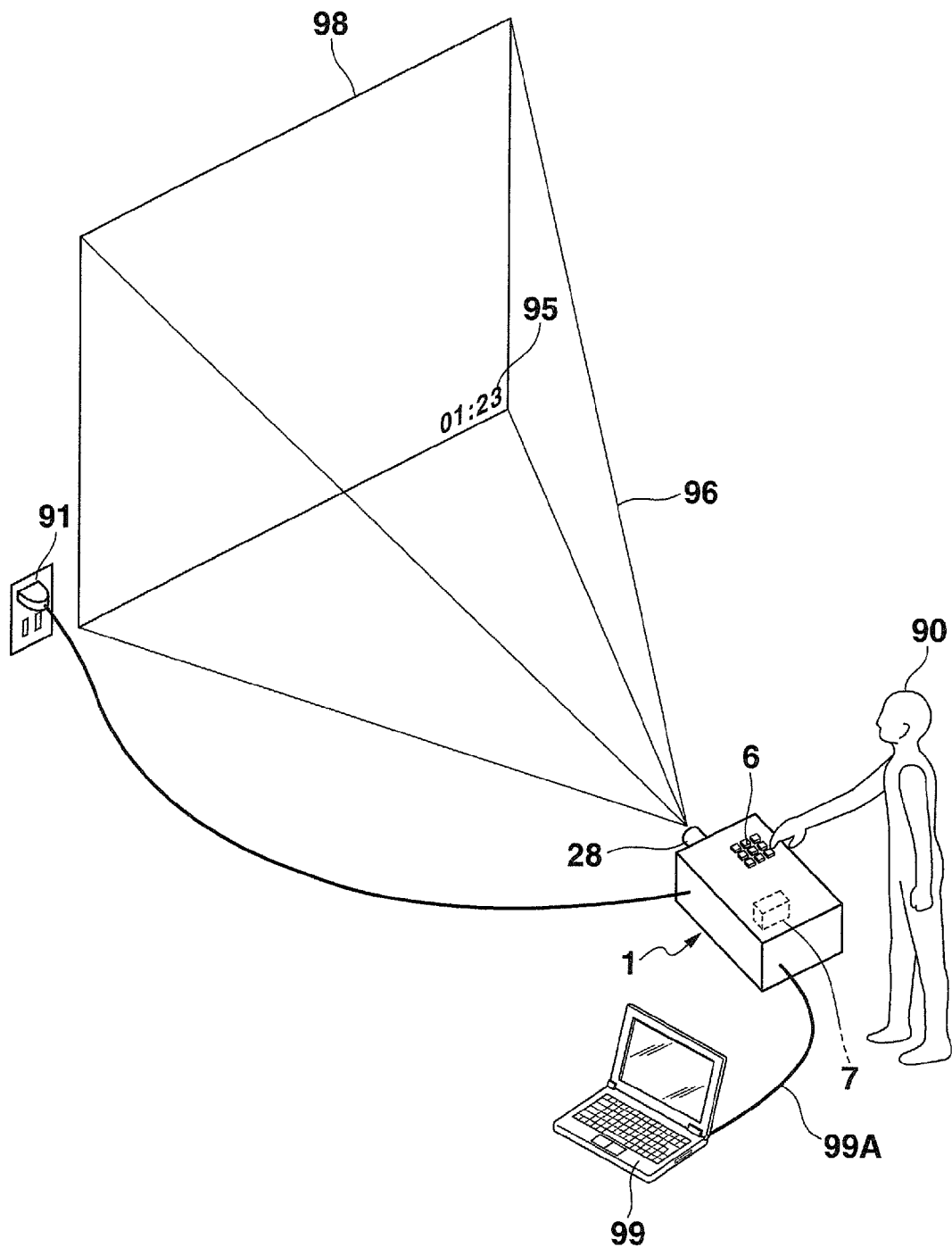
FIG. 4 is a perspective view illustrating a usage state of an electronic device according to second and third embodiments of the present invention.

FIG. 4 is a perspective view illustrating a usage state of the projection device 1 according to the second embodiment.

The user 90 performs projection by using the projected image 98 which is projected by the projection device 1. In the projected image 98, a display time 95 during time keeping is displayed. The display time 95 is displayed by the projection device 1. Concretely, the display time 95 is displayed in the projected image 98 by superimposing a signal for displaying the display time 95 on the video signal by the projection device 1. The projection device 1 has a time keeping function, and the display time 95 represents the time kept by the projection device 1. The numeral values of the display time 95 change by the minutes with time.

In the case of counting-up type time keeping, the display time 95 represents time from a time-keeping start time (especially, lecture start time) until the current time. In the case of counting-down type time keeping, the display time 95 represents time from the current time until a time-keeping end time (especially, lecture end expected time). Thus, the user 90 can deliver a lecture while recognizing the time from the start of the lecture and remaining time of the lecture by visually confirming the display time 95.

A user can increase/decrease the kept time (set time) in stages by operating the operation section 6 of the projection device 1 before start of time keeping, and there are a plurality of options of the user setting regarding the kept time. Specifically, the kept time can be increased/decreased in four stages, and there are the first set time (the first option), the second set time (the second option), the third set time (the third option) and the fourth set time (the fourth option) as the options of the user setting regarding the kept time. The values of the first set time, the second set time, the third set time and the fourth set time are different from one another, and they meet the relation "the first set time>the second set time>the third set time>the fourth set time". For example, the first set time, the second set time, the third set time and the fourth set time are 100 minutes, 80 minutes, 60 minutes and 40 minutes, respectively. When the user 90 sets the first set time in the user setting by operating the operation section 6, time keeping of the first set time is performed by the projection device 1, and the display time 95 during the time keeping is displayed in the projected image 98. The same can be said for the cases of the second set time, the third set time and the fourth set time. In this regard, however, the present invention does not limit the number of stages of the user setting regarding time keeping to four.

Incidentally, the longer the set time is, the longer the time during which the projection device 1 needs to drive becomes, and the larger the consumption power value becomes. In other words, the magnitude correlation of the consumption power values in the case of selecting the respective set times is "the first set time>the second set time>the third set time>the fourth set time".

The magnitude of the electrical storage residual quantity of the storage battery 7 is judged with a predetermined threshold value as a reference, and permission/prohibition of option selections is decided on the basis of comparison between the electrical storage residual quantity of the storage battery 7 and the predetermined threshold value (see the following Table).

TABLE 1

| CONDITION | OPTIONS PERMITTED TO BE SELECTED | OPTIONS PROHIBITED FROM BEING SELECTED |
|---|---|---|
| $1^{ST}$ TH < RESIDUAL QUANTITY | $1^{ST}$ SET TIME, $2^{nd}$ SET TIME, $3^{rd}$ SET TIME AND $4^{TH}$ SET TIME | NONE |
| $2^{nd}$ TH < RESIDUAL QUANTITY ≤ $1^{st}$ TH | $2^{nd}$ SET TIME, $3^{rd}$ SET TIME AND $4^{TH}$ SET TIME | $1^{ST}$ SET TIME |
| $3^{rd}$ TH < RESIDUAL QUANTITY ≤ $2^{nd}$ TH | $3^{rd}$ SET TIME AND $4^{TH}$ SET TIME | $1^{ST}$ SET TIME AND $2^{nd}$ SET TIME |
| $4^{th}$ TH < RESIDUAL QUANTITY ≤ $3^{rd}$ TH | $4^{TH}$ SET TIME | $1^{ST}$ SET TIME, $2^{nd}$ SET TIME AND $3^{rd}$ SET TIME |
| RESIDUAL QUANTITY ≤ $4^{th}$ TH | NONE | $1^{ST}$ SET TIME, $2^{nd}$ SET TIME, $3^{rd}$ SET TIME AND $4^{TH}$ SET TIME |

As illustrated in above Table 1, when the residual quantity of the electricity stored in the storage battery 7 exceeds the first threshold value ($1^{st}$ TH), selections of the first set time ($1^{st}$ set time), the second set time ($2^{nd}$ set time), the third set time ($3^{rd}$ set time) and the fourth set time ($4^{th}$ set time) are permitted in the user setting regarding the kept time.

When the residual quantity of the electricity stored in the storage battery 7 is equal to or less than the first threshold value and exceeds the second threshold value ($2^{nd}$ TH) (wherein the first threshold value>the second threshold value), selections of the second set time, the third set time and the fourth set time are permitted, but selection of the first set time is prohibited, in the user setting regarding the kept time.

When the residual quantity of the electricity stored in the storage battery 7 is equal to or less than the second threshold value and exceeds the third threshold value ($3^{rd}$ TH) (wherein the second threshold value>the third threshold value), selections of the third set time and the fourth set time are permitted, but selections of the first set time and the second set time are prohibited, in the user setting regarding the kept time.

When the residual quantity of the electricity stored in the storage battery 7 is equal to or less than the third threshold value and exceeds the fourth threshold value ($4^{th}$ TH) (wherein the third threshold value>the fourth threshold value), selection of the fourth set time is permitted, but selections of the first set time, the second set time and the third set time are prohibited, in the user setting, regarding the kept time.

When the residual quantity of the electricity stored in the storage battery 7 is equal to or less than the fourth threshold value, selections of the first set time, the second set time, the third set time and the fourth set time are prohibited in the user setting regarding the kept time.

Because the residual quantity of electricity stored in the storage battery 7 can be converted into the remaining time during which the projection device 1 can operate by the residual quantity of electricity, the electrical storage residual quantity corresponds to the remaining time. In addition, because the charge control section 8 detects the residual quantity of electricity stored in the storage battery 7, the charge control section 8 corresponds to a conversion section (converting member) that converts the detected residual quantity into the remaining time during which the projection device 1 can operate.

Here, if the first threshold value is converted into the remaining time during which the projection device 1 can operate by the electrical storage residual amount at the first threshold value, the obtained conversion value becomes equal to the first set time. In other words, the state that the residual quantity of electricity stored in the storage battery 7 exceeds the first threshold value corresponds to the state that the remaining time during which the projection device 1 can operate exceeds the first set time, and the state that the residual quantity of electricity stored in the storage battery 7 is equal to or less than the first threshold value corresponds to the state that the remaining time during which the projection device 1 can operate is equal to or less than the first set time. Similarly, if the second threshold value is converted into the remaining time, the obtained conversion value becomes equal to the second set time. If the third threshold value is converted into the remaining time, the obtained conversion value becomes equal to the third set time. If the fourth threshold value is converted into the remaining time, the obtained conversion value becomes equal to the fourth set time.

The table below shows the correlation among the first threshold value ($1^{st}$ TH), the second threshold value ($2^{nd}$ TH), the third threshold value ($3^{rd}$ TH), the fourth threshold value ($4^{th}$ the first set time ($1^{st}$ set time), the second set time ($2^{nd}$ set time), the third set time ($3^{rd}$ set time) and the fourth set time ($4^{th}$ set time).

TABLE 2

$1^{ST}$ TH > $2^{ND}$ TH > $3^{RD}$ TH > $4^{TH}$ TH
REMAINING TIME CONVERTED FROM $1^{ST}$ TH = $1^{ST}$ SET TIME
REMAINING TIME CONVERTED FROM $2^{ND}$ TH = $2^{ND}$ SET TIME
REMAINING TIME CONVERTED FROM $3^{RD}$ TH = $3^{RD}$ SET TIME
REMAINING TIME CONVERTED FROM $4^{TH}$ TH = $4^{TH}$ SET TIME
$1^{ST}$ SET TIME > $2^{ND}$ SET TIME > $3^{RD}$ SET TIME > $4^{TH}$ SET TIME

As described above, when the remaining time during which the projection device 1 can operate exceeds the first set time (when the residual quantity of electricity stored in the storage battery 7 exceeds the first threshold value), selection of the first set time is permitted in the user setting regarding the kept time. According to this, even when the user setting is set to the first set time and time keeping of the first set time is started, the time keeping is terminated before the residual quantity of electricity stored in the storage battery 7 is fully discharged. In other words, exhaustion of battery of the projection device 1 can be avoided before time keeping of the first set time is terminated. The same can be said for the case that the remaining time during which the projection device 1 can operate exceeds the second set time, the third set time, or the fourth set time.

Figure 5:
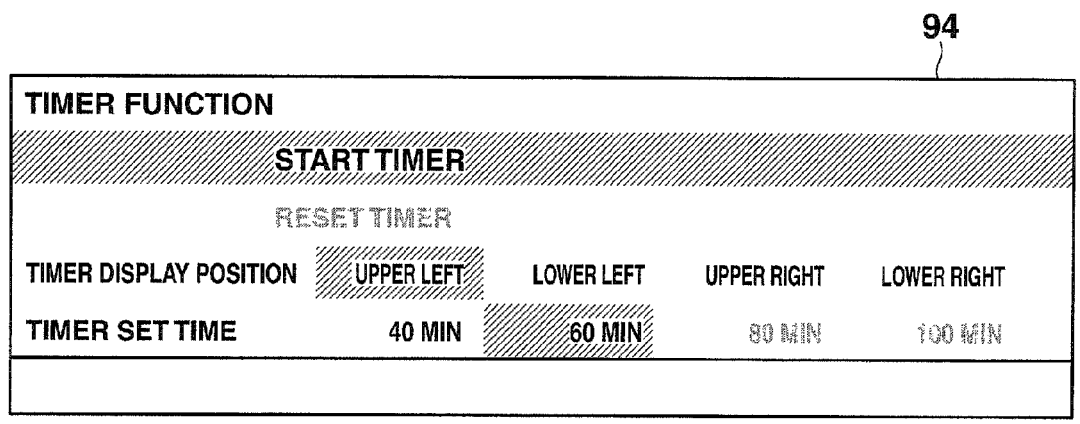
FIG. 5 is a diagram illustrating a user setting display region displayed by the electronic device.

When increasing/decreasing the kept time (set time), the user setting display region 94 as illustrated in FIG. 5 is synthesized with the projected image 98 by the projection device 1. In the user setting display region 94, the plural options (the first set time, the second set time, the third set time and the fourth set time) of the user setting regarding the kept time are displayed (see the line of "timer set time" illustrated in FIG. 5). Among these options, currently-selected options and non-selected options are displayed so as to be distinguishable from each other. Specifically, a color except white or a pattern is added to backgrounds of the selected options, and a white color is added to backgrounds of the non-selected options.

Among the options displayed in the user setting display region 97, the options permitted to be selected and the options prohibited from being selected are displayed so as to be distinguishable from each other. For example, characters representing the options permitted to be selected are displayed with a black color, and characters representing the options prohibited from being selected are displayed with a gray color or a semitransparent color.

The user 90 can increase/decrease the kept time by operating the operation section 6 while looking at the user setting display region 94.

In the user setting display region 94, a start timer icon and a reset timer icon are displayed. When the user 90 selects the start timer icon or the reset timer icon by operating the operation section 6, time keeping of the selected option (any of the first to fourth set times) is started or reset.

Additionally, in the user setting display region 94, options ("upper left", "lower left", "upper right" or "lower right") regarding the display position of the display time 95 (see FIG. 4) are displayed. When the user 90 selects any of the options by operating the operation section 6 while looking at the user setting display region 94, the display time 95 is displayed at the position of the selected option.

Figure 6:
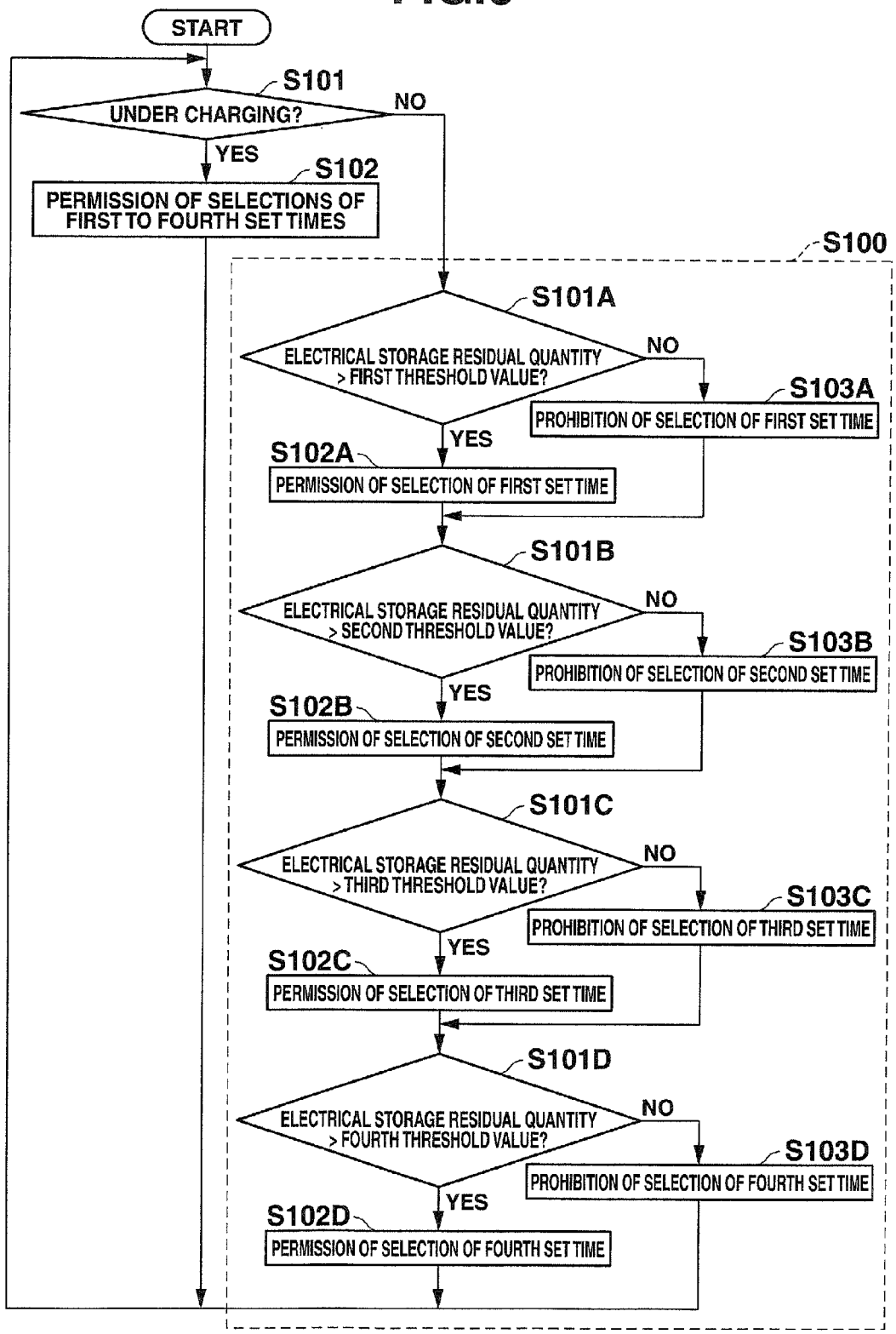
FIG. 6 is a flowchart for explaining a flow of processing executed by the computer included in the electronic device.

Subsequently, processing to be executed by the system controller 3 on the basis of the program 5 will be described. FIG. 6 is a flowchart of a main routine of judging processing executed by the system controller 3.

As illustrated in FIG. 6, the system controller 3 judges whether or not charging is being performed on the basis of the charge presence/absence signal input from the charge control section 8 (Step S101). At that time, when electrical power is being supplied to the charge control section 8 from the power source device 9 (Step S101: YES), the system controller 3 permits selections of the first to fourth set times, and stores the fact that selections of the first to fourth set times are permitted (Step S102). After that, processing by the system controller 3 returns to Step S101.

On the other hand, when the electrical power is not being supplied to the charge control section 8 from the power source device 9 (Step S101: NO), the system controller 3 executes the permission/prohibition deciding processing of FIG. 6 (Step S100), and when these processes terminate, processing by the system controller 3 returns to Step S101.

Thus, the system controller 3 repeatedly executes the permission/prohibition processing illustrated in FIG. 6.

Next, the permission/prohibition deciding processing will be described. Incidentally, processing of comparison between the electrical storage residual quantity and the first threshold value (S101A to S103A), comparison between the electrical storage residual quantity and the second threshold value (S101B to S103B), comparison between the electrical storage residual quantity and the third threshold value (S101C to S103C), and comparison between the electrical storage residual quantity and the forth threshold value (S101D to S104D) can be sequentially performed in a predetermined order different from the order of this embodiment. Alternatively, processing of comparison between the electrical storage residual quantity and the first threshold value (S101A to S103A), comparison between the electrical storage residual quantity and the second threshold value (S101B to S103B), comparison between the electrical storage residual quantity and the third threshold value (S101C to S103C), and comparison between the electrical storage residual quantity and the forth threshold value (S101D to S104D) can be performed concurrently by the system controller 3.

As illustrated in FIG. 6, the system controller 3 decides whether or not selection of each of the options (the first set time, the second set time, the third set time and the fourth set time) of the user setting regarding the kept time is permitted on the basis of the electrical storage residual quantity detected by the charge control section 8 (see Step S101A to Step S103A, Step S101B to S103B, Step S101C to Step S103C and Step S101D to Step D103D).

The permission/prohibition deciding processing with respect to selection of the first set time as the option will be described in detail with reference to the FIG. 7. The first threshold value is used for deciding permission/prohibition of selection of the first set time. Concretely, the system controller 3 compares the electrical storage residual quantity detected by the charge control section 8 with the first threshold value (Step S101A).

When the system controller 3 judges that the electrical storage residual quantity exceeds the first threshold value (Step S101A: YES), the system controller 3 permits selection of the first set time (Step S102A). Then, the system controller 3 stores the fact that selection of the first set time is permitted. After that, the processing shifts to Step S101B in which the electrical storage residual quantity detected by the charge control section 8 is compared with the second threshold value.

On the other hand, when the system controller 3 judges that the electrical storage residual quantity is equal to or less than the first threshold value (Step S101A: NO), the system controller 3 prohibits selection of the first set time (Step S103A). Then, the system controller 3 stores the fact that selection of the first set time is prohibited. After that, the processing shifts to Step S101B in which the electrical storage residual quantity detected by the charge control section 8 is compared with the second threshold value.

The second threshold value is used for deciding permission/prohibition of selection of the second set time, the third threshold value is used for deciding permission/prohibition of selection of the third set time, and the fourth threshold value is used of deciding permission/prohibition of selection of the fourth set time. As illustrated in FIG. 6, processing of comparing the electrical storage residual quantity detected by the charge control section 8 with the second threshold value, the third threshold value or the fourth threshold value to decide permission/prohibition of selection of the second set time, the third set time or the fourth set time by the system controller 3 is same as the processing of comparing the electrical storage residual quantity detected by the charge control section 8 with the first threshold value to decide permission/prohibition of selection of the first set time by the system controller 3. In other words, each of Step S101B to Step S103B, Step S101C to Step S103C and Step S101D to Step S103D corresponds to Step S101A to Step S103A.

Regardless of whether the electrical power is being supplied to the charge control section 8 from the power source device 9, when the user 90 inputs a command of a user setting mode by operation in the operation section 6, the system controller 3 executes the user setting processing. The user setting processing is performed after the processing illustrated in FIG. 6 is performed one or more times. In this regard, however, because the permission/prohibition deciding processing is repeatedly executed, sometimes the user setting processing is performed in parallel with the permission/prohibition deciding processing (Step S100). Incidentally, it is also possible to execute the user setting processing subsequently to Step S102, S102D and S103D in FIG. 6.

The user setting processing is executed for selecting one of the options (the first set time, the second set time, the third set time and the fourth set time) of the user setting regarding the kept time. Hereinafter the user setting processing will be described specifically.

First, the system controller 3 generates the display signal of the user setting display region 94 to output the display signal to the video signal processing section 23. By this, the display signal of the user setting display region 94 is superimposed on the video signal by the video signal processing section 23, and the user setting display region 94 is synthesized with the projected image 98.

At that time, the system controller 3 determines display modes of the plural options (the first set time, the second set time, the third set time and the fourth set time) on the basis of the stored result (see Step S102, Steps S102A, S103A, S102B, S103B, S102C, S103C, S102D and S103D) of the processing illustrated in FIG. 6, and generates the display signal of the user setting display region 94 according to the display modes. Specifically, the system controller 3 creates the display signal for implementing the display modes by which the options permitted to be selected and the options prohibited from being selected are distinguishable from each other, and outputs the display signal to the video signal processing section 23. Thus, each of the option which is prohibited from being selected by the permission/prohibition deciding member and the option which is permitted to be selected by the permission/prohibition deciding member is indicated so as to be distinguishable. Incidentally, also display modes by which the options permitted to be selected are displayed in the user setting display region 97 and the options prohibited from being selected are not displayed in the user setting display region 97 can be adopted.

Then the user 90 selects any one of the options by operating the operation section 6. Concretely, the signal according to the operation content is output to the system controller 3 when the user 90 operates the operation section 6, and the system controller 3 selects any one of the options on the basis of the signal. At that time, the system controller 3 does not accept selections of the options which are prohibited from being selected as a result of the permission/prohibition deciding processing illustrated in FIG. 6, and accepts selections of the options which are permitted to be selected as a result of the permission/prohibition deciding processing illustrated in FIG. 6.

After that, when the user 90 selects the start timer icon by operating the operation section 6, the system controller 3 starts time keeping of the selected option (any of the first set time, the second set time, the third set time or the fourth set time). During the time keeping, the system controller 3 generates the display signal for displaying the display time 95, and outputs the display signal to the video signal processing section 23. By this, the display signal of the display time 95 is superimposed on the video signal by the video signal processing section 23, and the display time 95 is synthesized with the projected image 98.

According to this embodiment, the following advantages can be obtained.

(a) The larger the electrical storage residual quantity of the storage battery 7 is, the longer the kept time can be. The smaller the electrical storage residual quantity of the storage battery 7 is, the shorter the kept time can be. By this, variation of customization regarding time keeping can be changed.

(b) Because selection of the first set time is prohibited in the user setting regarding time keeping when the remaining time during which the projection device 1 can operate becomes equal to or less than the first set time, exhaustion of battery of the projection device 1 can be avoided in the middle of the time keeping. The same can be said for the case that the remaining time during which the projection device 1 can operate becomes equal to or less than the second set time, the third set time, or the fourth set time.

[Third Embodiment]

The same referential marks are used for components which are common in the first and third embodiments.

The projection device 1 of the third embodiment has the same configuration as that of the projection device of the first embodiment (see FIG. 2). In this regard, however, the program 5 stored in the program memory 4 of the third embodiment is different from the program 5 stored in the program memory 4 of the first embodiment. Additionally, processing executed by the system controller 3 according to the program 5 in the third embodiment is different from processing executed by the system controller 3 according to the program 5 in the first embodiment.

In the first embodiment, the user setting is related to the output luminance of the projection device main body section 2 (especially the light source device 27), and permission/prohibition of the options of the user setting is decided on the basis of the electrical storage residual quantity of the storage battery 7. On the other hand, in the third embodiment, the user setting is related to a kept time (set time), and permission/prohibition of the options of the user setting is decided on the basis of the electrical storage residual quantity of the storage battery 7.

FIG. 4 illustrates a perspective view illustrating a usage state of the projection device 1 according to the third embodiment.

The output luminance of the projection device main body section 2 (especially the light source 27) can be adjusted in two stages. Concretely, by operating the operation section 6 of the projection device 1 by the user 90, the output luminance of the projection device main body section 2 can be selected so as to be one of the high luminance setting or the low luminance setting. The luminance of the projection light 96 in the case that the setting of the output luminance of the projection device main body section 2 is the high luminance setting is higher than the luminance of the projection light 96 in the case that the setting of the output luminance of the projection device main body section 2 is the low luminance setting. The high luminance setting is a high consumption power setting, and the low luminance setting is a low consumption power setting. Incidentally, the system controller 3 stores the content of the user setting regardless of whether the user setting regarding the output luminance of the projection device main body section 2 is set to the high luminance setting or the low luminance setting.

The user 90 performs projection by using the projected image 98 which is projected by the projection device 1. In the projected image 98, the display time 95 during the time keeping is displayed. The display time 95 is displayed by the projection device 1. Concretely, by superimposing the signal for displaying the display time 95 on the video signal input to the projection device 1, the display time 95 is synthesized with the projected image 98. The projection device 1 has the time keeping function, and the display time 95 represents the time kept by the projection device 1. The numeric values of the display time 95 change by the minutes with time. The time keeping is the counting-up type or the counting-down type. Thus, the user 90 can deliver a lecture while recognizing the time from the start of the lecture and remaining time of the lecture by visually confirming the display time 95.

A user can increase/decrease the kept time (set time) in stages by operating the operation section 6 of the projection device 1 before start of time keeping, and there are the plural options of the user setting regarding the kept time. Specifically, the kept time can be increased/decreased in four stages, and there are the first set time, the second set time, the third set time and the fourth set time as the options of the user setting regarding the kept time. These kept times are same as those of the second embodiment, and descriptions thereof are omitted.

In the case that the setting of the output luminance of the projection device main body section 2 is the low luminance setting, permission/prohibition of the options of the user setting regarding the kept time is decided similarly to the case of the second embodiment.

Concretely, when the residual quantity of electricity stored in the storage battery 7 exceeds the first threshold value for the low luminance setting ($1^{st}$ TH for low L setting), selections of the first set time, the second set time, the third set time and the fourth set time are permitted in the user setting regarding the kept time.

When the residual quantity of electricity stored in the storage battery 7 is equal to or less than the first threshold value for the low luminance setting and exceeds the second threshold value for the low luminance setting ($2^{nd}$ TH for low L setting) (wherein the first threshold value for the low luminance setting>the second threshold value for the low luminance setting), selections of the second set time, the third set time and the fourth set time are permitted, but selection of the first set time is prohibited, in the user setting regarding the kept time.

When the residual quantity of electricity stored in the storage battery 7 is equal to or less than the second threshold value for the low luminance setting and exceeds the third threshold value for the low luminance setting ($3^{rd}$ TH for low L setting) (wherein the second threshold value for the low luminance>the third threshold value for the low luminance), selections of the third set time and the fourth set time are permitted, but the selection of the first set time and the second time are prohibited, in the user setting regarding the kept time.

When the residual quantity of electricity stored in the storage battery 7 is equal to or less than the third threshold value for the low luminance setting and exceeds the fourth threshold value for the low luminance setting ($4^{th}$ TH for low L setting) (wherein the third threshold value for the low luminance setting>the fourth threshold value for the low luminance setting), selection of the fourth set time is permitted, but selections of the first set time, the second set time and the third set time are prohibited, in the user setting regarding the kept time.

When the residual quantity of electricity stored in the storage battery 7 is equal to or less than the fourth threshold value for the low luminance setting, selections of the first set time, the second set time, the third set time and the fourth set time are prohibited in the user setting regarding the kept time.

In the case that the setting of the output luminance of the projection device main body section 2 is set to the high luminance setting, permission/prohibition of the options of the user setting regarding the kept time are decided as described below (see following Table 3).

(1) Regarding Permission/Prohibition of Selection of the First Set Time

When the residual quantity of electricity stored in the storage battery 7 exceeds the first threshold value for the high luminance setting ($1^{st}$ TH for high L setting) (wherein the first threshold value for the high luminance setting>the first threshold value for the low luminance setting), selection of the first set time is permitted in the user setting regarding the kept time.

When the residual quantity of electricity stored in the storage battery 7 is equal to or less than the first threshold value for the high luminance setting and exceeds the first threshold value for the low luminance setting, selection of the first set time is permitted with a condition attached in the user setting regarding kept time. The condition refers to changing the setting of the output luminance of the projection device main body section 2 from the high luminance setting to the low luminance setting (the same can be said for the conditions described in the following cases of (2) to (4)).

When the residual quantity of electricity stored in the storage battery 7 is equal to or less than the first threshold value for the low luminance setting, selection of the first set time is prohibited in the user setting regarding the kept time.

Here, the first threshold value for the high luminance setting is the high threshold value, and the first threshold value for the low luminance setting is the low threshold value.

(2) Regarding Permission/Prohibition of Selection of the Second Set Time

When the residual quantity of electricity stored in the storage battery 7 exceeds the second threshold value for the high luminance setting ($1^{st}$ TH for high L setting) (wherein the second threshold value for the high luminance setting>the second threshold value for the low luminance setting, and the second threshold value for the high luminance setting<the first threshold value for the high luminance setting), selection of the second set time is permitted in the user setting regarding the kept time.

When the residual quantity of electricity stored in the storage battery 7 is equal to or less than the second threshold value for the high luminance setting and exceeds the second threshold value for the low luminance setting, selection of the second set time is permitted with the condition attached in the user setting regarding kept time.

When the residual quantity of electricity stored in the storage battery 7 is equal to or less than the second threshold value for the low luminance setting, selection of the second set time is prohibited in the user setting regarding the kept time.

Here, the second threshold value for the high luminance setting is the high threshold value, and the second threshold value for the low luminance setting is the low threshold value.

(3) Regarding Permission/Prohibition of Selection of the Third Set Time

When the residual quantity of electricity stored in the storage battery 7 exceeds the third threshold value for the high luminance setting ($3^{rd}$ TH for high L setting) (wherein the third threshold value for the high luminance setting>the third threshold value for the low luminance setting, and the third threshold value for the high luminance setting>the second threshold value for the high luminance setting), selection of the third set time is permitted in the user setting regarding the kept time.

When the residual quantity of electricity stored in the storage battery 7 is equal to or less than the third threshold value for the high luminance setting and exceeds the third threshold value for the low luminance setting, selection of the second set time is permitted with the condition attached in the user setting regarding kept time.

When the residual quantity of electricity stored in the storage battery 7 is equal to or less than the third threshold value for the low luminance setting, selection of the third set time is prohibited in the user setting regarding the kept time.

Here, the third threshold value for the high luminance setting is the high threshold value, and the third threshold value for the low luminance setting is the low threshold value.

(4) Regarding Permission/Prohibition of Selection of the Fourth Set Time

When the residual quantity of electricity stored in the storage battery 7 exceeds the fourth threshold value for the high luminance setting ($4^{th}$ for high L setting) (wherein the fourth threshold value for the high luminance setting>the fourth threshold value for the low luminance setting, and the fourth threshold value for the high luminance setting>the third threshold value for the high luminance setting), selection of the fourth set time is permitted in the user setting regarding the kept time.

When the residual quantity of electricity stored in the storage battery 7 is equal to or less than the fourth threshold value for the high luminance setting and exceeds the fourth threshold value for the low luminance setting, selection of the second set time is permitted with the condition attached in the user setting regarding kept time.

When the residual quantity of electricity stored in the storage battery 7 is equal to or less than the fourth threshold value for the low luminance setting, selection of the fourth set time is prohibited in the user setting regarding the kept time.

Here, the fourth threshold value for the high luminance setting is the high threshold value, and the fourth threshold value for the low luminance setting is the low threshold value.

time during which the projection device 1 can operate by the electrical storage residual quantity of the storage battery 7 when the luminance setting of the projection device main body section 2 (especially, the light source device 27) is the high luminance setting. The low luminance setting remaining time refers to a time during which the projection device 1 can operate by the electrical storage residual quantity of the storage battery 7 when the luminance setting of the projection device main body section 2 (especially, the light source device 27) is the low luminance setting. If the electrical storage residual quantity converted from the high luminance setting remaining time and the electrical storage residual quantity converted from the low luminance setting remaining time are equal to each other, the high luminance setting remaining time would be shorter than the low luminance setting remaining time.

Because the charge control section 8 detects the residual quantity of electricity stored in the storage battery 8, the charge control section 8 corresponds to a conversion section (converting member) that converts the detected residual quantity into the high luminance setting remaining time and/or the low luminance setting remaining time during which the projection device 1 can operate.

Here, if the first threshold value for the high luminance setting is converted into the high luminance setting remaining time during which the projection device 1 can operate by the electrical storage residual amount at the first threshold value for the high luminance setting, the obtained conversion value becomes equal to the first set time. In other words, the state that the residual quantity of electricity stored in the storage battery 7 exceeds the first threshold value for the high luminance setting corresponds to the state that the high luminance setting remaining time during which the projection device 1 can operate exceeds the first set time, and the state that the residual quantity of electricity stored in the storage battery 7 is equal to or less than the first threshold value for the high luminance setting corresponds to the state that the high luminance setting remaining time during which the projection device 1 can operate is equal to or less than the first set time. Similarly, if the second threshold value for the high luminance setting is converted into the high luminance setting remaining time, the obtained conversion value becomes equal to the second set time. If the third threshold

TABLE 3

| OPTIONS | CONDITION FOR PERMITTING OPTION SELETION | CONDITION FOR PERMITTING OPTION SELETION CONDITONALLY | CONDITION FOR PROHIBITING OPTION SELECTION |
|---|---|---|---|
| $1^{ST}$ SET TIME | $1^{ST}$ TH FOR HIGH L SETTING < RESIDUAL QUANTITY | $1^{ST}$ TH FOR LOW L SETTING < RESIDUAL QUANTITY ≤ $1^{ST}$ TH FOR HIGH L SETTING | RESIDUAL QUANTITY ≤ $1^{ST}$ TH FOR LOW L SETTING |
| $2^{ND}$ SET TIME | $2^{ND}$ TH FOR HIGH L SETTING < RESIDUAL QUANTITY | $2^{ND}$ TH FOR LOW L SETTING < RESIDUAL QUANTITY ≤ $2^{ND}$ TH FOR HIGH L SETTING | RESIDUAL QUANTITY ≤ $2^{ND}$ TH FOR LOW L SETTING |
| $3^{RD}$ SET TIME | $3^{RD}$ TH FOR HIGH L SETTING < RESIDUAL QUANTITY | $3^{RD}$ TH FOR LOW L SETTING < RESIDUAL QUANTITY ≤ $3^{RD}$ TH FOR HIGH L SETTING | RESIDUAL QUANTITY ≤ $3^{RD}$ TH FOR LOW L SETTING |
| $4^{TH}$ SET TIME | $4^{TH}$ TH FOR HIGH L SETTING < RESIDUAL QUANTITY | $4^{TH}$ TH FOR LOW L SETTING < RESIDUAL QUANTITY ≤ $4^{TH}$ TH FOR HIGH L SETTING | RESIDUAL QUANTITY ≤ $4^{TH}$ TH FOR LOW L SETTING |

Because the residual quantity of electricity stored in the storage battery 7 can be converted into a high luminance setting remaining time (high L RT) and/or a low luminance setting remaining time (low L RT), the electrical storage residual quantity corresponds to the high luminance setting remaining time and/or the low luminance setting remaining time. The high luminance setting remaining time refers to a value for the high luminance setting is converted into the high luminance setting remaining time, the obtained conversion value becomes equal to the third set time. If the fourth threshold value for the high luminance setting is converted into the high luminance setting remaining time, the obtained conversion value becomes equal to the fourth set time.

Moreover, if the first threshold value for the low luminance setting is converted into the low luminance setting remaining time during which the projection device 1 can operate by the electrical storage residual amount at the first threshold value for the low luminance setting, the obtained conversion value becomes equal to the first set time. In other words, the state that the residual quantity of electricity stored in the storage battery 7 exceeds the first threshold value for the low luminance setting corresponds to the state that the low luminance setting remaining time during which the projection device 1 can operate exceeds the first set time, and the state that the residual quantity of electricity stored in the storage battery 7 is equal to or less than the first threshold value for the low luminance setting corresponds to the state that the low luminance setting remaining time during which the projection device 1 can operate is equal to or less than the first set time. Similarly, if the second threshold value for the low luminance setting is converted into the low luminance setting remaining time, the obtained conversion value becomes equal to the second set time. If the third threshold value for the low luminance setting is converted into the low luminance setting remaining time, the obtained conversion value becomes equal to the third set time. If the fourth threshold value for the low luminance setting is converted into the low luminance setting remaining time, the obtained conversion value becomes equal to the fourth set time.

The correlation among the first threshold value for the high luminance setting ($1^{st}$ TH for high L setting), the second threshold value for the high luminance setting ($2^{nd}$ TH for high L setting), the third threshold value for the high luminance setting ($3^{rd}$ TH for high L setting), the fourth threshold value for the high luminance setting ($4^{th}$ TH for high L setting), the first threshold value for the low luminance setting ($1^{st}$ TH for low L setting), the second threshold value for the low luminance setting ($2^{nd}$ TH for low L setting), the third threshold value for the low luminance setting ($3^{rd}$ TH for low L setting), the fourth threshold value for the low luminance setting ($4^{th}$ TH for low L setting), the first set time, the second set time, the third set time and the fourth set time is shown in the following table.

TABLE 4

$1^{ST}$ TH FOR HIGH L SETTING > $2^{ND}$ TH FOR HIGH L SETTING > $3^{RD}$ TH FOR HIGH L SETTING > $4^{TH}$ TH FOR HIGH L SETTING
$1^{ST}$ TH FOR LOW L SETTING > $2^{ND}$ TH FOR LOW L SETTING > $3^{RD}$ TH FOR LOW L SETTING > $4^{TH}$ TH FOR LOW L SETTING
$1^{ST}$ TH FOR HIGH L SETTING > $1^{ST}$ TH FOR LOW L SETTING
$2^{ND}$ TH FOR HIGH L SETTING > $2^{ND}$ TH FOR LOW L SETTING
$3^{RD}$ TH FOR HIGH L SETTING > $3^{RD}$ TH FOR LOW L SETTING
$4^{TH}$ TH FOR HIGH L SETTING > $4^{TH}$ TH FOR LOW L SETTING
HIGH L RT CONVERTED FROM $1^{ST}$ TH FOR HIGH L SETTING = LOW L RT CONVERTED FROM $1^{ST}$ TH FOR LOW L SETTING = $1^{ST}$ SET TIME
HIGH L RT CONVERTED FROM $2^{ND}$ TH FOR HIGH L SETTING = LOW L RT CONVERTED FROM $2^{ND}$ TH FOR LOW L SETTING = $2^{ND}$ SET TIME
HIGH L RT CONVERTED FROM $3^{RD}$ TH FOR HIGH L SETTING = LOW L RT CONVERTED FROM $3^{RD}$ TH FOR LOW L SETTING = $3^{RD}$ SET TIME
HIGH L RT CONVERTED FROM $4^{TH}$ TH FOR HIGH L SETTING = LOW L RT CONVERTED FROM $4^{TH}$ TH FOR LOW L SETTING = $4^{TH}$ SET TIME
$1^{ST}$ SET TIME > $2^{ND}$ SET TIME > $3^{RD}$ SET TIME > $4^{TH}$ SET TIME

As described above, when the remaining time during which the projection device 1, in which the luminance of the projection light 96 is set to the high luminance, can operate, exceeds the first set time, or when the remaining time during which the projection device 1, in which the luminance of the projection light 96 is set to the low luminance, can operate, exceeds the first set time (namely, when the residual quantity of electricity stored in the storage battery 7 exceeds the first threshold value for the high luminance setting, or when the residual quantity of electricity stored in the storage battery 7 exceeds the first threshold value for the low luminance setting,) selection of the first set time is permitted in the user setting regarding the kept time. By this, exhaustion of battery of the projection device 1 can be avoided before time keeping of the first set time is terminated. The same can be said for the cases that selections of the second set time, the third set time and the fourth set time are permitted.

Figure 7:
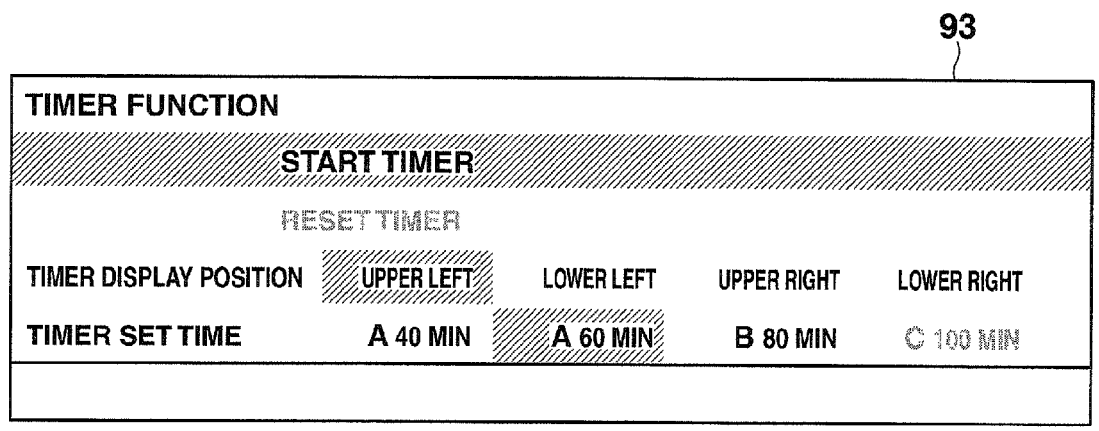
FIG. 7 is a diagram illustrating a user setting display region displayed by the electronic device.

When increasing/decreasing the kept time (set time), the user setting display region 93 as illustrated in FIG. 7 is synthesized with the projected image 98 by the projection device 1. In the user setting display region 93, the plural options of the user setting regarding the kept time are displayed. Among these options, currently-selected options and non-selected options are displayed so as to be distinguishable from each other. The user 90 can increase/decrease the kept time by operating the operation section 6 while looking at the user setting display region 93.

Moreover, among the options displayed in the user setting display region 93, the options permitted to be selected, the options permitted to be selected with the condition attached, and the options prohibited from being selected are displayed so as to be distinguishable from one another. For example, the mark "A" is added to each option permitted to be selected, the mark "B" is added to each option permitted to be selected with the condition attached, and the mark "C" is added to each option prohibited from being selected. Additionally, the characters representing the options permitted to be selected are displayed with a black color, and the characters representing the options prohibited from being selected are displayed with a gray color or a semitransparent color.

Furthermore, when the user 90 selects the start timer icon in the user setting display region 93 by operating the operation section 6, time keeping of the selected option (any of the first to fourth set times) is started. On the other hand, when the user 90 selects the reset timer icon in the user setting display region 93 by operating the operation section 6 during the time keeping, the time keeping is reset. In the user setting display region 93, the options regarding the display position of the display time 95 is displayed, and when the user 90 selects any of the options by operating the operation section 6, the display time 95 is displayed at the position of the selected option.

Figure 8:
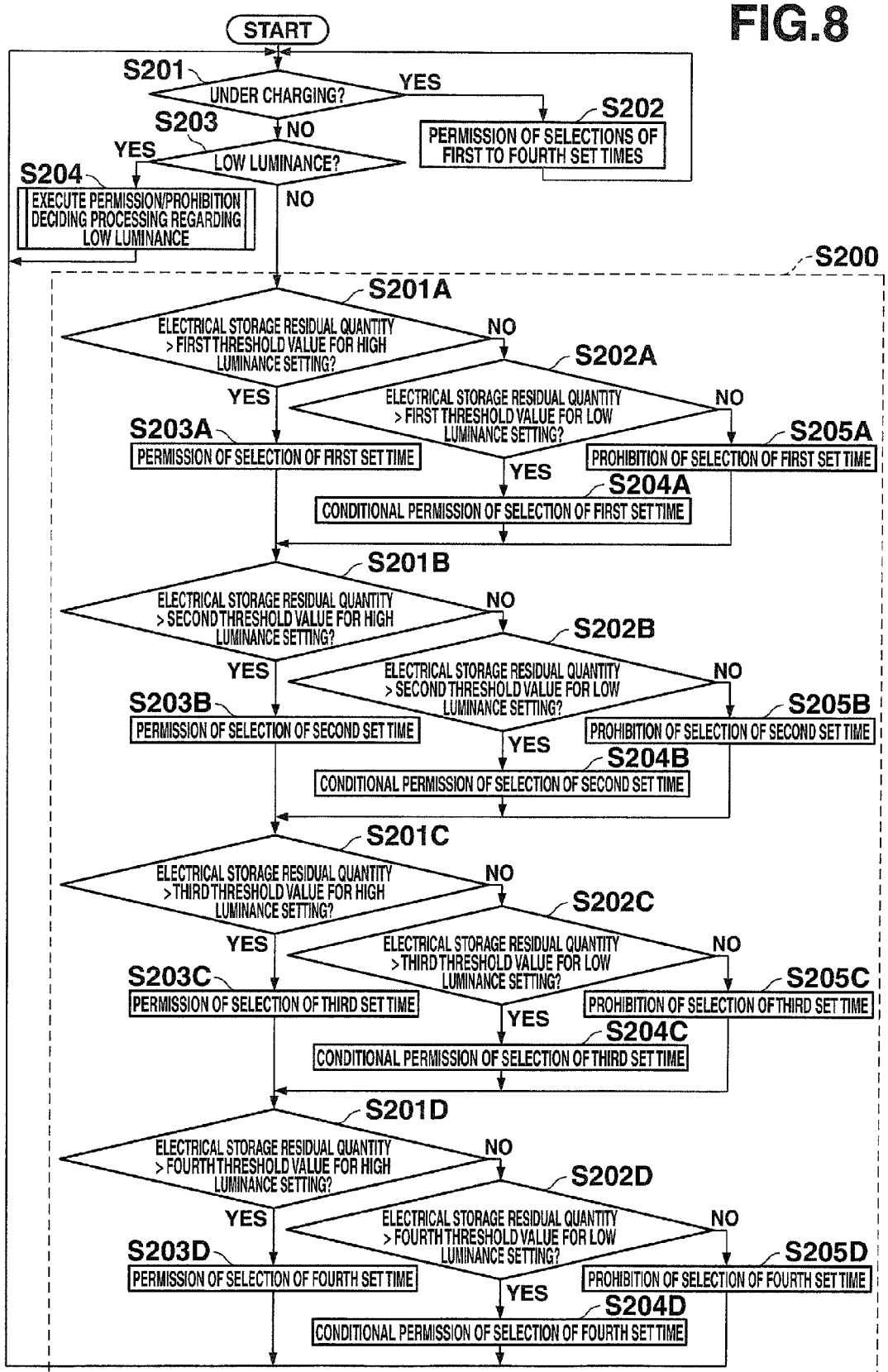
FIG. 8 is a flowchart for explaining a flow of processing executed by the computer included in the electronic device.

Next, processing to be executed by the system controller 3 on the basis of the program 5 will be described. FIG. 8 is a flowchart of a main routine of judging processing to be executed by the system controller 3.

As illustrated in FIG. 8, the system controller 3 judges whether or not charging is being performed on the basis of the charge presence/absence signal input from the charge control section 8 (Step S201). At that time, when electrical power is being supplied to the charge control section 8 from the power source device 9 (Step S201: YES), the system controller 3 permits selections of the first to fourth set times, and stores the fact that the selections of the first to fourth set times are permitted (Step S202). Then, processing by the system controller 3 returns to Step S201.

On the other hand, when electrical power is not being supplied to the charge control section 8 from the power source device 9 (Step S201: NO), the system controller 3 judges whether the user setting regarding the luminance of the projection device main body section. 2 (especially light source device 27) is the low luminance setting or the high luminance setting (Step S203). This judgment is performed on the basis of the contents stored in the system controller 3 or on the basis of the dimming signal to be output to the light source control section 26 from the system controller 3.

In the case that the luminance setting of the projection device main body section 2 (especially the light source device 27) is the low luminance setting (Step S203: YES), the permission/prohibition deciding processing (see S100 in FIG. 6) of the second embodiment is executed by the system controller 3 (Step S204). In this case, in the description of the permission/prohibition deciding processing of the second embodiment referring to FIG. 6, "the first threshold value" is replaced with "the first threshold value for the low luminance setting", "the second threshold value" is replaced with "the second threshold value for the low luminance setting", "the third threshold value" is replaced with "the third threshold value for the low luminance setting", and "the fourth threshold value" is replaced with "the fourth threshold value for the low luminance setting". When the permission/prohibition deciding processing illustrated in FIG. 6 is terminated, processing by the system controller 3 returns to Step S201.

In the case that the luminance setting of the projection device main body section 2 (especially the light source device 27) is the high luminance setting (Step S203: NO), the permission/prohibition deciding processing S200 illustrated in FIG. 8 is executed by the system controller 3. When the permission/prohibition deciding processing illustrated in FIG. 8 is terminated, processing by the system controller 3 returns to Step S201.

Next, the permission/prohibition deciding processing will be described with reference to FIG. 8. As illustrated in FIG. 8, the system controller 3 decides whether or not selection of each of the options (the first set time, the second set time, the third set time and the fourth set time) of the user setting regarding the kept time is permitted on the basis of the electrical storage residual quantity detected by the charge control section 8 (see Step S201A to Step S204A, Step S201B to Step S204B, Step S201C to Step S204C and Step S201D to Step S204D).

The permission/prohibition deciding processing of selection of the first set time as the option will be described with reference to FIG. 8. When deciding whether or not selection of the first set time is permitted, the first threshold value for the high luminance setting and the first threshold value for the low luminance setting are used. Concretely, the system controller 3 compares the electrical storage residual quantity detected by the charge control section 8 with the first threshold value for the high luminance setting and the first threshold value for the low luminance setting (Step S201A, S202A).

When the system controller 3 judges that the electrical storage residual quantity exceeds the first threshold value for the high luminance setting as a result of comparison (Step S201A: YES), the system controller 3 permits selection of the first set time (Step S203A). The system controller 3 then stores the fact that selection of the first set time is permitted. After that, processing shifts to the permission/prohibition deciding processing of selection of the second set time.

When the system controller 3 judges that the electrical storage residual quantity is equal to or less than the first threshold value for the high luminance setting and exceeds the first threshold value for the low luminance setting as a result of comparison (Step S201A: NO, Step S202A: YES), the system controller 3 permits selection of the first set time with the condition attached (Step S204A). The system controller 3 then stores the fact that selection of the first set time is permitted with the condition attached. After that, processing shifts to the permission/prohibition deciding processing of selection of the second set time.

When the system controller 3 judges that the electrical storage residual quantity is equal to or less than the first threshold value for the low luminance setting as a result of comparison (Step S202A: NO), the system controller 3 prohibits selection of the first set time (Step S205A). The system controller 3 then stores the fact that selection of the first set time is prohibited. After that, processing shifts to the permission/prohibition deciding processing of selection of the second set time.

Then, as illustrated in FIG. 8, permission/prohibition of selection of the second set time is decided, permission/prohibition of selection of the third set time is decided, and permission/prohibition of selection of the fourth set time is decided. When deciding permission/prohibition of selection of the second set time, permission/prohibition of selection of the third set time and permission/prohibition of selection of the fourth set time, the second threshold value for the high luminance setting and the second threshold value for the low luminance setting, the third threshold value for the high luminance setting and the third threshold value for the low luminance setting, and the fourth threshold value for the high luminance setting and the fourth threshold value for the low luminance setting are used, respectively. The permission/prohibition deciding processing of selections of the second set time, the third set time and the fourth set time by comparing the electrical storage residual quantity detected by the charge control section 8 with the second threshold value for the high luminance setting and the second threshold value for the low luminance setting, the third threshold value for the high luminance setting and the third threshold value for the low luminance setting, and the fourth threshold value for the high luminance setting and the fourth threshold value for the low luminance setting, respectively, by the system controller 3, is same as the permission/prohibition deciding processing of selection of the first set time by comparing the electrical storage residual quantity detected by the charge control section 8 with the first threshold value for the high luminance setting and the first threshold value for the low luminance setting by the system controller 3. Step S201B to Step S205B, Step S201C to Step S205C and Step S201D to Step S205D correspond to Step S201A to Step S205A.

Regardless of whether the electrical power is being supplied to the charge control section 8 from the power source device 9, and regardless of whether the luminance setting of the projection device main body section 2 (especially light source device 27) is the low luminance setting or the high luminance setting, when the user 90 inputs the command of the user setting mode by operation in the operation section 6, the system controller 3 executes the user setting processing. The user setting processing is performed after the processing illustrated in FIG. 8 is performed one or more times. In this regard, however, because the processing illustrated in FIG. 8 is repeatedly executed, sometimes the user setting processing is performed in parallel with the permission/prohibition deciding processing (Steps S100, S200). Incidentally, it is also possible to execute the user setting processing subsequently to Step S202, S204 and S203D to S205D in FIG. 8.

The user setting processing is executed for selecting one of the options (the first set time, the second set time, the third set time and the fourth set time) of the user setting regarding the kept time. Hereinafter the user setting processing will be described specifically.

First, the system controller 3 generates the display signal of the user setting display region 93 to output the display signal to the video signal processing section 23. By this, the display signal of the user setting display region 93 is superimposed on the video signal by the video signal processing section 23, and the user setting display region 93 is synthesized with the projected image 98.

At that time, the system controller 3 determines display modes of the plural options (the first set time, the second set time, the third set time and the fourth set time) on the basis of the stored result (see Step S102A, S103A, S102B, S103B, S102C, S103C, S102D, S103D, S202, S203A to S205A, S203B to S205B, S203C to S205C and S203D to S205D) of the permission/prohibition deciding processing (S100, S200) illustrated in FIG. 6 and FIG. 8, and generates the display signal of the user setting display region 93 according to the display modes. Specifically, the system controller 3 creates the display signal for implementing the display modes by which the options permitted to be selected, the options permitted to be selected with the condition attached, and the options prohibited from being selected are distinguishable from one another, and outputs the display signal to the video signal processing section 23. Thus, each of the option which is prohibited from being selected by the permission/prohibition deciding member, the option which is permitted to be selected conditionally by the permission/prohibition deciding member, and the option which is permitted to be selected by the permission/prohibition deciding member is indicated so as to be distinguishable.

Then the user 90 selects anyone of the options by operating the operation section 6. Concretely, the signal according to the operation content is output to the system controller 3 when the user 90 operates the operation section 6, and the system controller 3 selects anyone of the options on the basis of the signal.

At that time, the system controller 3 does not accept selections of the options prohibited from being selected as a result of the permission/prohibition deciding processing (S100) illustrated in FIG. 6 or the permission/prohibition deciding processing (S200) illustrated in FIG. 8.

The system controller 3 accepts selections of the options permitted to be selected as a result of the permission/prohibition deciding processing (S100) illustrated in FIG. 6 or the permission/prohibition deciding processing (S200) illustrated in FIG. 8.

The system controller 3 accepts selections of the options permitted to be selected conditionally as a result of the permission/prohibition deciding processing (S100) illustrated in FIG. 6 or the permission/prohibition deciding processing (S200) illustrated in FIG. 8. In this case, system controller 3 outputs the dimming signal representing the low luminance to the light source control section 26, and the light source control section 26 causes the light source device 27 to emit light with low luminance.

After that, when the user 90 selects the start timer icon by operating the operation section 6, the system controller 3 starts time keeping of the selected option (any of the first set time, the second set time, the third set time or the fourth set time). During the time keeping, the system controller 3 generates the display signal for displaying the display time 95, and outputs the display signal to the video signal processing section 23. By this, the display signal of the display time 95 is superimposed on the video signal by the video signal processing section 23, and the display time 95 is synthesized with the projected image 98.

According to this embodiment, the following advantages can be obtained.

(a) The larger the electrical storage residual quantity of the storage battery 7, the longer the kept time can become. The smaller the electrical storage residual quantity of the storage battery 7, the shorter the kept time can become. The number of options selectable in the case that the luminance setting of the projection device main body section 2 is the low luminance setting is likely to be larger than the number of options selectable in the case that the luminance setting of the projection device main body section 2 is the high luminance setting. Therefore, depending on the magnitude of the electrical storage residual quantity of the storage battery 7, variation of customization regarding the kept time can be changed.

(b) In the case that the luminance setting of the projection device main body section 2 is the low luminance setting, because selection of the first set time is prohibited in the user setting regarding the kept time when the low luminance setting remaining time during which the projection device 1 can operate becomes equal to or less than the first set time, exhaustion of battery of the projection device 1 can be avoided in the middle of the time keeping. The same can be said for the case that the low luminance setting remaining time during which the projection device 1 can operate becomes equal to or less than the second set time, the third set time, or the fourth set time.

(c) In the case that the luminance setting of the projection device main body section 2 is the high luminance setting, because selection of the first set time is permitted conditionally or prohibited in the user setting regarding the kept time when the high luminance setting remaining time during which the projection device 1 can operate becomes equal to or less than the first set time, exhaustion of battery of the projection device 1 can be avoided in the middle of the time keeping. The same can be said for the case that the high luminance setting remaining time during which the projection device 1 can operate becomes equal to or less than the second set time, the third set time, br the fourth set time.

(d) In the case that the luminance setting of the projection device main body section 2 is the high luminance setting, selection of the first set time is permitted conditionally in the user setting regarding the kept time when the low luminance setting remaining time during which the projection device 1 can operate exceeds the first set time, though the high luminance setting remaining time during which the projection device 1 can operate is equal to or less than the first set time. By this, even when selection of the first set time is prohibited in principle, time keeping of the first set time can be executed in the case a user earnestly hopes to execute the time keeping of the first set time. In this case, though the time keeping of the first set time is performed, the luminance setting of the projection device main body section 2 is changed from the high luminance setting to the low luminance setting. Accordingly, exhaustion of battery of the projection device 1 can be avoided in the middle of the time keeping. The same can be said for the case that the high luminance setting remaining time during which the projection device 1 can operate becomes equal to or less than the second set time, the third set time, or the fourth set time.

[Variation]

Also the configuration where the projection device 1 has all of the functions of the first to third embodiments, and the system controller 3 executes the processes of the first to third embodiments can be adopted. For example, the system controller 3 performs the processes of the first embodiment when the first mode is set in the mode setting, the system controller 3 performs the processes of the second embodiment when the second mode is set in the mode setting, and the system controller 3 performs the processes of the third embodiment when the third mode is set in the mode setting. The mode setting enables selecting any of the first mode, the second mode and the third mode by operating the operation section 6 of the projection device 1 by the user 90.

Moreover, each of the first to third embodiments has the configuration where the system controller 3 firstly judges whether or not charging is being performed in the projection device 1, and when charging is being performed, permits selections of all options of the user setting. Therefore, in the case the projection device 1 operates by the external power source under charging and the electrical storage residual quantity of the storage battery is small, prohibition of selection of the user setting can be avoided.

As a computer readable medium storing programs for executing the above processing, there can be used a ROM, a hard disk, a non-volatile memory such as a flash memory and a portable recording medium such as a CD-ROM. As a medium for providing data of the programs via a predetermined communication line, also carrier wave can be adopted.

Although the embodiment of the present invention are described above, the technical scope of the present invention is not limited to the above-described embodiments, and determined on the basis of the description of the claims. The technical scope of the present invention includes also the scope of equivalents thereof to which modifications not related to the nature of the present invention are added.

Additionally, the present invention is not limited to the above-described embodiment, and can be variously changed within the scope not departing from the principle of the present invention in execution phase. Moreover, the functions executed in the above embodiments can be combined and implemented to the extent possible. The above-described embodiments include various steps, and various inventions would be extracted when combining the plural disclosed components arbitrary. For example, even when some components are deleted from all of the components described in the embodiments, the configuration from which these components are deleted would be extracted as the present invention as long as the same advantages can be obtained.

What is claimed is:

1. An electronic device to be used for a projection device having a function of adjusting luminance of projection light, comprising:
    a storage battery;
    a circuit that detects an electrical storage residual quantity of the storage battery;
    an operation section that receives an input of a user setting including a plurality of options; and
    a controller, wherein
    the controller decides whether or not selection of each of the plurality of options corresponding to the user setting received by the operation section is permitted on a basis of the electrical storage residual quantity detected by the circuit, and
    the controller indicates an option which is prohibited from being selected by the controller and an option which is permitted to be selected by the controller so that each of the option prohibited from being selected and the option permitted to be selected is distinguishable, and wherein
    different set times are set with respect to the plurality of options of the user setting respectively,
    the plurality of options include a plurality of set times,
    the controller compares, for a selected one of the plurality of set times, the electrical storage residual quantity detected by the circuit with a plurality of low threshold values for a low luminance setting of the projection device, the plurality of low threshold values corresponding to the selected set time, and a plurality of high threshold values for a high luminance setting of the projection device, each of the plurality of set times corresponding to each of the plurality of high and low threshold values on a one-to-one basis, wherein the controller decides permission/prohibition of selection of each of the plurality of set times corresponding to each of the plurality of high and low threshold values on a basis of a result of comparison between the electrical storage residual quantity detected by the circuit and each of the plurality of high and low threshold values, wherein at least one high threshold value from the plurality of high threshold values corresponding to the selected set time, which is higher than at least one low threshold value from the plurality of low threshold values, and wherein the controller permits selection of the selected set time when judging that the electrical storage residual quantity detected by the circuit exceeds the at least one high threshold value for the high luminance setting, permits selection of the selected set time with a condition attached when judging that the electrical storage residual quantity detected by the circuit is equal to or less than the at least one high threshold value for the high luminance setting and exceeds the at least one low threshold value for low luminance setting, and prohibits selection of the selected set time when judging that the electrical storage residual quantity detected by the circuit is equal to or less than the at least one low threshold value for the low luminance setting, and
    the controller indicates an option which is permitted to be selected with the condition attached by the controller so that the option permitted to be selected with the condition attached is distinguishable.

2. The electronic device according to claim 1, wherein different consumption powers are set with respect to the plurality of options of the user setting, respectively.

3. The electronic device according to claim 1, further comprising:
    a projection device main body section that projects a projected image, wherein
    different output luminances of the projection device main body section are set with respect to the plurality of options of the user setting, respectively.

4. The electronic device according to claim 1, wherein
    the plurality of set times are obtained by converting the plurality of high threshold values into a remaining time during which the electronic device can operate by the electrical storage residual quantity of the storage battery with a high luminance setting.

5. The electronic device according to claim 1, further comprising:
    a projection device main body section that projects a projected image, wherein
    the plurality of set times are obtained by converting the plurality of high threshold values into a remaining time during which the electric device can operate by the electrical storage residual quantity of the storage battery, when the electric device being in the state that an output luminance of a projection device main body section is set to the high luminance setting, and the plurality of set times are obtained by converting the plurality of low threshold values into a remaining time during which the electric device can operate by the electrical storage residual quantity of the storage battery, when the electric device being in the state that the output luminance of the projection device main body section is set to the low luminance setting.

6. The electronic device according to claim 1, wherein the condition attached is that an output luminance of a projection device main body section is set to be changed from the high luminance setting to the low luminance setting.

7. The electronic device according to claim 1, wherein the electric device is operable only by electrical power of the storage battery.

8. A non-transitory computer readable medium which stores a program for causing a computer of an electronic device to be used for a projection device having a function of adjusting luminance of projection light, which includes the computer, a storage battery, and a residual detection section that detects an electrical storage residual quantity of the storage battery, to execute the steps of:

receiving an input of a user setting including a plurality of options;

deciding whether or not selection of each of the plurality of options corresponding to the received user setting is permitted on a basis of the electrical storage residual quantity detected by the residual quantity detection section; and indicating an option which is prohibited from being selected in the deciding step and an option which is permitted to be selected in the deciding step so that each of the option prohibited from being selected and the option permitted to be selected is distinguishable, wherein different set times are set with respect to the plurality of options of the user setting respectively, the plurality of options include a plurality of set times, each of the plurality of set times corresponding to each of a plurality of high and low threshold values on a one-to-one basis, the deciding includes deciding permission/prohibition of selection of each of the plurality of set times corresponding to each of the plurality of high and low threshold values on a basis of a result of comparison between the electrical storage residual quantity detected by the circuit and each of the plurality of high and low threshold values, the deciding includes comparing, for a selected one of the plurality of set times, the electrical storage residual quantity detected by the residual quantity detection section with a low threshold value for a low luminance setting of the projection device and a high threshold value for a high luminance setting of the projection device which is higher than the low threshold value, permitting selection of a set time from the plurality of set times when judging that the electrical storage residual quantity detected by the residual quantity detection section exceeds the high threshold value, permitting selection of the set time with a condition attached when judging that the electrical storage residual quantity detected by the residual quantity detection section is equal to or less than the high threshold value and exceeds the low threshold value, and prohibiting selection of the set time when judging that the electrical storage residual quantity detected by the residual quantity detection section is equal to or less than the low threshold value, and the indicating includes indicating the option which is permitted to be selected with the condition attached by the deciding so that the option permitted to be selected with the condition attached is distinguishable.

9. A method for deciding permission/prohibition of selection, the method comprising the steps of:

detecting a residual quantity of a storage battery included in an electronic device, which is to be used for a projection device having a function of adjusting luminance of projection light, by a residual quantity detection section contained in the electronic device;

causing a computer of the electronic device to receive an input of a user setting including a plurality of options;

causing the computer to decide whether or not selection of each of the plurality of options corresponding to the received user setting is permitted on a basis of the electrical storage residual quantity detected by the residual quantity detection section; and causing the computer to indicate an option which is prohibited from being selected in the causing the computer to decide step and an option which is permitted to be selected in the causing the computer to decide step so that each of the option prohibited from being selected and the option permitted to be selected is distinguishable, wherein different set times are set with respect to the plurality of options of the user setting respectively, the plurality of options include a plurality of set times, each of the plurality of set times corresponding to each of a plurality of high and low threshold values on a one-to-one basis, the causing the computer to decide includes deciding permission/prohibition of selection of each of the plurality of set times corresponding to each of the plurality of high and low threshold values on a basis of a result of comparison between the electrical storage residual quantity detected by the circuit and each of the plurality of high and low threshold values, the causing the computer to decide includes comparing, for a selected one of the plurality of set times, the electrical storage residual quantity detected by the residual quantity detection section with a low threshold value for a low luminance setting of the projection device and a high threshold value for a high luminance setting of the projection device which is higher than the low threshold value, permitting selection of the one set time when judging that the electrical storage residual quantity detected by the residual quantity detection section exceeds the high threshold value, permitting selection of the one set time with a condition attached when judging that the electrical storage residual quantity detected by the residual quantity detection section is equal to or less than the high threshold value and exceeds the low threshold value, and prohibiting selection of the set time when judging that the electrical storage residual quantity detected by the residual quantity detection section is equal to or less than the predetermined low threshold value, and the causing the computer to indicate includes indicating an option which is permitted to be selected with the condition attached by the deciding so that the option permitted to be selected with the condition attached is distinguishable.

10. An electronic device comprising:
a storage battery;

a circuit that detects an electrical storage residual quantity of the storage battery; an operation section for receiving an input of a user setting including a plurality of options; and a controller, wherein the controller that decides whether or not selection of each of the plurality of options corresponding to the user setting received by the operation section is permitted on a basis of the electrical storage residual quantity detected by the circuit section;

the controller that indicates an option which is prohibited from being selected by the controller and an option which is permitted to be selected by the controller so that each of the option prohibited from being selected and the option permitted to be selected is distinguishable, wherein different set times are set with respect to the plurality of options of the user setting, respectively, the plurality of options include a plurality of set times, the controller compares, for a selected one of the plurality of set times, the electrical storage residual quantity detected by the circuit with one of a plurality of predetermined low threshold values for a low luminance setting of a projection device, the plurality of low threshold values corresponding to the selected one of the plurality of set times, and one of a plurality of predetermined high threshold values for a high luminance setting of the projection device, the plurality of high threshold values corresponding to the selected one of the plurality of set times which is higher than the one of the plurality of predetermined low threshold values, permits selection of the selected one of the plurality of set times when judging that the electrical storage residual quantity detected by the circuit exceeds the one of the plurality of predetermined high threshold values, permits selection of the selected one of the plurality of set times with a condition attached when judging that the electrical storage residual quantity detected by the circuit is equal to or less than the one of the plurality of predetermined high threshold values and exceeds the one of the plurality of predetermined low threshold values, and prohibits selection of the selected one of the plurality of set times when judging that the electrical storage residual quantity detected by the circuit is equal to or less than the one of the plurality of the predetermined low threshold values, and each of the plurality of set times, each of the plurality of high threshold values and each of the plurality of low threshold values correspond to one another by a one-to-one-to-one basis, the controller decides permission/prohibition of selection of each of the plurality of the set times corresponding to each of the high threshold values on a basis of a result of comparison between the electrical storage residual quantity detected by the circuit and the high threshold values and/or the low threshold values, and the controller indicates an option which is permitted to be selected with the condition attached by the controller so that the option permitted to be selected with the condition attached is distinguishable.

* * * * *